(12) United States Patent
Rosaen et al.

(10) Patent No.: US 11,703,363 B2
(45) Date of Patent: Jul. 18, 2023

(54) SYSTEMS AND METHODS FOR AN INLINE FLOW METER ASSEMBLY

(71) Applicant: DWYER INSTRUMENTS, LLC, Michigan City, IN (US)

(72) Inventors: Lars O. Rosaen, Plymouth, MI (US); Peter E. Hackett, Belleville, MI (US)

(73) Assignee: DWYER INSTRUMENTS, LLC, Michigan City, IN (US)

( * ) Notice: Subject to any disclaimer, the term of this patent is extended or adjusted under 35 U.S.C. 154(b) by 2 days.

(21) Appl. No.: 16/774,781

(22) Filed: Jan. 28, 2020

(65) Prior Publication Data
US 2021/0231475 A1 Jul. 29, 2021

(51) Int. Cl.
G01F 1/38 (2006.01)
G01F 1/42 (2006.01)

(52) U.S. Cl.
CPC ............... *G01F 1/386* (2013.01); *G01F 1/42* (2013.01)

(58) Field of Classification Search
CPC ... G01F 1/36; G01F 1/366; G01F 1/38; G01F 1/386; G01F 1/40; G01F 1/42
See application file for complete search history.

(56) References Cited

U.S. PATENT DOCUMENTS

| | | | |
|---|---|---|---|
| 3,218,853 A | 11/1965 | Ongaro | |
| 3,234,790 A * | 2/1966 | Ekstrom | G01F 1/386 |
| | | | 73/861.58 |
| 3,590,861 A | 7/1971 | Chittenden et al. | |
| 4,388,835 A * | 6/1983 | Rosaen | G01F 1/22 |
| | | | 73/861.58 |
| 4,869,432 A | 9/1989 | Christy | |
| 6,239,708 B1 * | 5/2001 | Young | G01F 1/363 |
| | | | 73/251 |
| 6,325,096 B1 | 12/2001 | Rising et al. | |
| 6,914,531 B1 * | 7/2005 | Young | G01F 1/363 |
| | | | 340/606 |

(Continued)

FOREIGN PATENT DOCUMENTS

| | | |
|---|---|---|
| WO | 87004277 A1 | 7/1987 |
| WO | 2010125392 A1 | 11/2010 |
| WO | 2014189395 A1 | 11/2014 |

OTHER PUBLICATIONS

Elster American Meter, Axial Flow Valves, Installation Instructions and Repair Parts List, 2013, pp. 1-30, Nebraska City, NE.

*Primary Examiner* — Erika J. Villaluna
(74) *Attorney, Agent, or Firm* — Dinsmore & Shohl LLP

(57) ABSTRACT

Embodiments described herein relate to a flow meter assembly. The inline flow meter assembly includes a housing, an elongated flow member, and a piston. The housing includes a fluid passage. The elongated flow member has a shaft portion and an opposite fluid flow portion. The fluid flow portion has an outer peripheral surface. The shaft portion is coupled to the housing. The piston has a plate. The plate has a plate orifice. The piston and the plate move axially between a no flow position where the outer peripheral surface of the fluid flow portion is engaged with the plate orifice to prevent a fluid flow and a full flow position where the outer peripheral surface of the fluid flow portion is disengaged with the plate orifice such that the fluid flow enters the plate orifice and passes through the fluid passage in the axial direction of movement of the piston.

20 Claims, 16 Drawing Sheets

(56) References Cited

U.S. PATENT DOCUMENTS

| | | |
|---|---|---|
| 7,128,086 B2 | 10/2006 | Kirchner et al. |
| 7,363,940 B2 | 4/2008 | Oberley et al. |
| 7,401,622 B2 | 7/2008 | Ungerecht |
| 9,850,741 B2 | 12/2017 | Cassel et al. |
| 10,126,758 B2 | 11/2018 | Ottestad |
| 2002/0100506 A1 | 8/2002 | May |
| 2005/0011554 A1 | 1/2005 | Davila et al. |
| 2012/0241662 A1 | 9/2012 | Clifford et al. |

\* cited by examiner

FIG. 10A

Elongated Flow Members

| Pins 1 to 40 | | | Pins 41 to 65 | | | Pins 66 to 83 | | |
|---|---|---|---|---|---|---|---|---|
| Pin (W-Water) (O-Oil) | Dia "A" | Angle "C" each Side degrees Water | Pin (W-Water) (O-Oil) | Dia "A" | Angle "C" each Side degrees Water | Pin (W-Water) (O-Oil) | Dia "A" | Angle "C" each Side degrees Water |
| 1-NW | 0 | 8.769 | 41-NW | 0.122 | 4.524 | 66-NW | 0.197 | 1.897 |
| 2-NW | 0.003 | 8.465 | 42-NW | 0.125 | 4.419 | 67-NW | 0.200 | 1.791 |
| 3-NW | 0.006 | 8.562 | 43-NW | 0.128 | 4.314 | 68-NW | 0.203 | 1.675 |
| 4-NW | 0.009 | 8.458 | 44-NW | 0.131 | 4.208 | 69-NW | 0.206 | 1.570 |
| 5-NW | 0.012 | 8.355 | 45-NW | 0.134 | 4.103 | 70-NW | 0.209 | 1.464 |
| 6-NW | 0.015 | 8.251 | 46-NW | 0.137 | 3.993 | 71-NW | 0.212 | 1.358 |
| 7-NW | 0.018 | 8.147 | 47-NW | 0.140 | 3.893 | 72-NW | 0.215 | 1.252 |
| 8-NW | 0.021 | 8.064 | 48-NW | 0.143 | 3.787 | 73-NW | 0.218 | 1.146 |
| 9-NW | 0.024 | 7.940 | 49-NW | 0.146 | 3.682 | 74-NW | 0.221 | 1.041 |
| 10-NW | 0.027 | 7.836 | 50-NW | 0.149 | 3.576 | 75-NW | 0.224 | 0.935 |
| 11-NW | 0.03 | 7.732 | 51-NW | 0.152 | 3.471 | 76-NW | 0.227 | 0.829 |
| 12-NW | 0.033 | 7.628 | 52-NW | 0.155 | 3.365 | 77-NW | 0.230 | 0.723 |
| 13-NW | 0.037 | 7.489 | 53-NW | 0.158 | 3.260 | 78-NW | 0.233 | 0.617 |
| 14-NW | 0.04 | 7.385 | 54-NW | 0.161 | 3.154 | 79-NW | 0.236 | 0.512 |
| 15-NW | 0.043 | 7.281 | 55-NW | 0.164 | 3.049 | 80-NW | 0.239 | 0.406 |
| 16-NW | 0.047 | 7.142 | 56-NW | 0.167 | 2.943 | 81-NW | 0.242 | 0.300 |
| 17-NW | 0.05 | 7.032 | 57-NW | 0.170 | 2.833 | 82-NW | 0.245 | 0.194 |
| 18-NW | 0.053 | 6.934 | 58-NW | 0.173 | 2.732 | 83-NW | 0.248 | 0.088 |
| 19-NW | 0.056 | 6.832 | 59-NW | 0.176 | 2.627 | | | |
| 20-NW | 0.059 | 6.725 | 60-NW | 0.179 | 2.521 | | | |
| 21-NW | 0.062 | 6.621 | 61-NW | 0.182 | 2.415 | | | |
| 22-NW | 0.065 | 6.516 | 62-NW | 0.185 | 2.310 | | | |
| 23-NW | 0.068 | 6.412 | 63-NW | 0.189 | 2.204 | | | |
| 24-NW | 0.071 | 6.307 | 64-NW | 0.191 | 2.093 | | | |
| 25-NW | 0.074 | 6.203 | 65-NW | 0.194 | 1.993 | | | |
| 28-NW | 0.083 | 5.889 | | | | | | |
| 29-NW | 0.086 | 5.784 | | | | | | |
| 30-NW | 0.089 | 5.679 | | | | | | |
| 31-NW | 0.092 | 5.574 | | | | | | |
| 32-NW | 0.095 | 5.469 | | | | | | |
| 33-NW | 0.098 | 5.365 | | | | | | |
| 34-NW | 0.101 | 5.260 | | | | | | |
| 35-NW | 0.104 | 5.155 | | | | | | |
| 36-NW | 0.107 | 5.0497 | | | | | | |
| 37-NW | 0.110 | 4.945 | | | | | | |
| 38-NW | 0.113 | 4.840 | | | | | | |
| 39-NW | 0.116 | 4.734 | | | | | | |
| 40-NW | 0.119 | 4.629 | | | | | | |
| Angles of Pins for Water are based on pin dia @Base = 0.2505 Diam "B" | | | | | | | | |
| Angles of Pins for Oil are based on pin dia @Base = 0.2460 Diam "B" | | | | | | | | |

Pins 5G to 30G

| Finished Pin # | Angle "C" Each Side Degrees Water | Diam "A" | Diam "B" Cone Base Dia Finished Water | Water Flow |
|---|---|---|---|---|
| 8309-2.5 | 9.46 | 0.00 | 0.250 | 2.50 GPM |
| 8329-2.75 | 10.09 | 0.00 | 0.267 | 2.75 GPM |
| 8309-3 | 10.57 | 0.00 | 0.280 | 3.00 GPM |
| 8309-3.5 | 11.60 | 0.00 | 0.308 | 3.50 GPM |
| 8309-4 | 12.48 | 0.00 | 0.332 | 4.00 GPM |
| 8309-5 | 14.00 | 0.00 | 0.374 | 5 GPM |
| 8309-6 | 15.29 | 0.00 | 0.410 | 6 GPM |
| 8309-7 | 16.42 | 0.00 | 0.442 | 7 GPM |
| 8309-8 | 17.47 | 0.00 | 0.472 | 8 GPM |
| 8309-9 | 18.40 | 0.00 | 0.499 | 9 GPM |
| 8309-10 | 19.32 | 0.00 | 0.526 | 10 GPM |
| 8309-12 | 20.87 | 0.00 | 0.572 | 12 GPM |
| 8309-13 | 21.60 | 0.00 | 0.594 | 13 GPM |
| 8309-15 | 22.94 | 0.00 | 0.635 | 15 GPM |
| 8309-16 | 23.59 | 0.00 | 0.655 | 16 GPM |
| 8309-18 | 24.77 | 0.00 | 0.692 | 18 GPM |
| 8309-20 | 25.86 | 0.00 | 0.727 | 20 GPM |
| 8309-25 | 28.25 | 0.00 | 0.806 | 25 GPM |
| 8309-30 | 30.31 | 0.00 | 0.877 | 30 GPM |

Pins 85 to 87

| Pin's Head Pin # | GPH | Dia "A" | Dia "B" | Angle "C" each Slide degrees Oil |
|---|---|---|---|---|
| 85-NW | 15 GPH | 0.064 | 0.124 | 1.06 |
| 86-NW | 10 GPH | 0.108 | 0.124 | 0.81 |
| 87-NW | 5 GPH | 0.115 | 0.124 | 0.35 |

FIG. 10B

| Pin Length "L" | |
|---|---|
| Pins 1-NW to 87-NW | 0.875 |
| Pins 2.5 GPM to 30 GPM | 0.750 |
| Pins 80 GPM to 300 GPM | 1.000 |

FIG. 10C

| Pins 80G to 300G | | | |
|---|---|---|---|
| Angle "C" each side degrees | Diam "A" | Diam "B" | Water Flow |
| 32.85 | 0.00 | 1.2912 | 80 GPM |
| 35.82 | 0.00 | 1.4435 | 100 GPM |
| 41.48 | 0.00 | 1.7681 | 150 GPM |
| 45.59 | 0.00 | 2.0415 | 200 GPM |
| 48.77 | 0.00 | 2.2824 | 250 GPM |
| 51.34 | 0.00 | 2.5 | 300 GPM |

FIG. 12B

| Orifice Plate 80G to 300G | | | |
|---|---|---|---|
| NOM DIA "Do" | MIN DIA "Do" | MIN DIA "DO" | Water Flow |
| 1.2932 | 1.2927 | 1.2937 | 80 GPM |
| 1.4455 | 1.445 | 1.446 | 100 GPM |
| 1.7701 | 1.7696 | 1.7706 | 150 GPM |
| 2.0435 | 2.043 | 2.044 | 200 GPM |
| 2.2844 | 2.2839 | 2.2849 | 250 GPM |
| 2.502 | 2.5015 | 2.5025 | 300 GPM |

PLATE ORIFICE

| FLOW RATE | NOM DIA "$d_0$" | MIN "$d_0$" | MAX "$d_0$" |
|---|---|---|---|
| 5,7,10 GPH | 0.1245 | 0.1240 | 0.1250 |
| Pin-1-83 & 2.00 GPM | 0.2505 | 0.2500 | 0.2510 |
| 2.50 GPM | 0.2505 | 0.2500 | 0.2510 |
| 2.75 GPM | 0.288 | 0.2675 | 0.2685 |
| 3.00 GPM | 0.281 | 0.2805 | 0.2815 |
| 3.50 GPM | 0.309 | 0.3085 | 0.3095 |
| 4.00 GPM | 0.333 | 0.3325 | 0.3335 |
| 5.00 GPM | 0.375 | 0.3745 | 0.3755 |
| 6.00 GPM | 0.412 | 0.4115 | 0.4125 |
| 7.00 GPM | 0.444 | 0.4435 | 0.4445 |
| 8.00 GPM | 0.474 | 0.4735 | 0.4745 |
| 9.00 GPM | 0.501 | 0.5005 | 0.5015 |
| 10.00 GPM | 0.528 | 0.5275 | 0.5285 |
| 12.00 GPM | 0.574 | 0.5735 | 0.5745 |
| 13.00 GPM | 0.596 | 0.5955 | 0.5965 |
| 15.00 GPM | 0.637 | 0.6365 | 0.6375 |
| 16.00 GPM | 0.657 | 0.6565 | 0.6575 |
| 18.00 GPM | 0.694 | 0.6935 | 0.6945 |
| 20.00 GPM | 0.729 | 0.7285 | 0.7295 |
| 25.00 GPM | 0.808 | 0.8075 | 0.8085 |
| 30.00 GPM | 0.879 | 0.8785 | 0.8795 |

FIG. 12A

SYSTEMS AND METHODS FOR AN INLINE FLOW METER ASSEMBLY

TECHNICAL FIELD

The present specification generally relates to flow controls and, more specifically, to flow controls having interchangeable components that provide an adjustable axial fluid flow path.

BACKGROUND

Fluid regulators are commonly found in process control systems to control a desired flow amount of fluid (e.g., liquids, gasses, and the like) distributed within these systems. As such, a precise amount of fluid over some time is needed. Fluid regulators are generally used to regulate the fluid to this constant value over time. Generally, fluid regulators have an inlet that receives a supply fluid at a relatively high pressure and regulates, or provides a lower and constant fluid output through an outlet. The outlet is fluidly connected to the inlet by a fluid passageway. Typically, fluid regulators include a diaphragm or a piston configured to regulate the fluid between the inlet and the outlet such that the desired fluid flow rate is obtained.

The fluid passageway may further include a flow control member that moves relative to a seating surface or valve seat that defines an orifice of the fluid passageway. A fluid regulator with a given orifice size or geometry provides a particular or maximum fluid flow capacity or flow rate at a given pressure drop (e.g., a fluid flow coefficient). To provide different fluid flow capacities, a flow control member must be replaced to change an orifice size thereby changing a desired fluid flow capacity. However, changing the flow control member requires changing of the fluid regulator. As such, this is timely and expensive, damage to the flow regulator is more likely to happen, errors between installing the various parts is more likely to occur and, in some instances, a differently sized valve body with a smaller or larger fluid passageway is needed to accommodate the new desired fluid flow rate.

Accordingly, a need exists for a device that simplifies the changing of components to achieve a wide reach of desired flow rates that reduces the time, effort and costs associated with changing the desired flow rate in flow regulator devices.

SUMMARY

In one embodiment, an inline flow meter assembly is provided. The inline flow meter assembly includes a housing, an elongated flow member, and a piston. The housing includes a fluid passage. The elongated flow member has a shaft portion and an opposite fluid flow portion. The fluid flow portion has an outer peripheral surface. The shaft portion is coupled to the housing. The piston has a plate. The plate has a plate orifice. The piston and the plate move axially between a no flow position where the outer peripheral surface of the fluid flow portion is engaged with the plate orifice to prevent a fluid flow and a full flow position where the outer peripheral surface of the fluid flow portion is disengaged with the plate orifice such that the fluid flow enters the plate orifice and passes through the fluid passage in the axial direction of movement of the piston.

In another embodiment, a flow meter system is provided. The flow meter system includes a flow control assembly and a flow meter assembly. The flow control assembly includes a housing, an elongated flow member, and a piston. The housing has a fluid passage. The elongated flow member has a shaft portion and an opposite fluid flow portion. The fluid flow portion has an outer peripheral surface. The shaft portion is coupled to the housing. The piston has a plate. The plate has a plate orifice. The piston and the plate move in an axial direction between a no flow position and a full flow position. The flow meter assembly includes a display device, a dial assembly, an arm and a pointer assembly. The arm is coupled to the dial assembly and is configured to move across a surface of the piston and through an angle based on a fluid flow rate such that the arm translates the axial direction of movement of the piston into a rotational movement to the dial assembly such that the pointer assembly displays the fluid flow rate on the display device.

In yet another embodiment, a method of changing a current flow rate to a desired flow rate of an inline flow control assembly is provided. The method includes removing a flow fastener from a receiving cavity of an elongated flow member; removing the elongated flow member from a first portion of a housing, removing a pair of plate fasteners from a plate such that the plate with an orifice is separated from a piston and removed from the housing, and choosing a replacement elongated flow member and corresponding plate that correlate to the desired flow rate. The method continues by inserting the corresponding plate and installing the pair of plate fasteners such that the corresponding plate with the orifice is coupled to the piston and positioning the replacement elongated flow member and installing the flow fastener into the receiving cavity such that the elongated flow member is coupled to the first portion of the housing.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 10A schematically depicts a table of a plurality of differently sized elongated flow members of the inline flow control assembly of FIG. 1, according to one or more embodiments described herein;

FIG. 10B schematically depicts a table of a differently sized lengths of the plurality of elongated flow members of the inline flow control assemblies of FIGS. 1 and 6, according to one or more embodiments described herein;

FIG. 10C schematically depicts a table of a plurality of differently sized elongated flow members of the inline flow control assembly of FIG. 6, according to one or more embodiments described herein;

FIG. 12A schematically depicts a table of the plurality of differently sized plate orifices and a corresponding flow rate of the inline flow control assembly of FIG. 1, according to one or more embodiments described herein;

FIG. 12B schematically depicts a table of the plurality of differently sized plate orifices and a corresponding flow rate of the inline flow control assembly of FIG. 6, according to one or more embodiments described herein;

DETAILED DESCRIPTION

Figure 1:
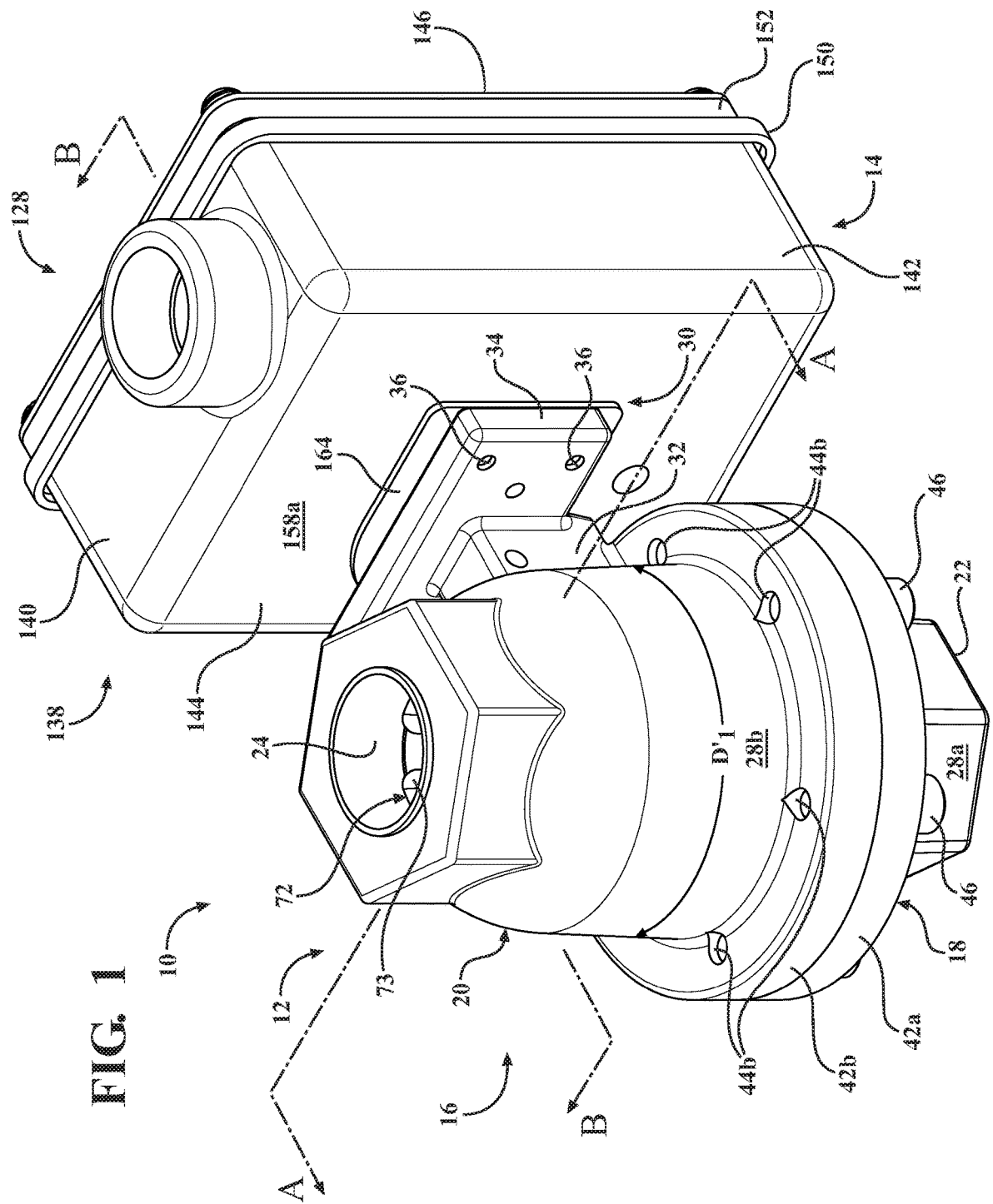
FIG. 1 schematically depicts a perspective view of an inline flow meter system, which includes an inline flow control assembly and a flow meter assembly, according to one or more embodiments shown or described herein.

Embodiments described herein generally relate to a flow meter system. The flow meter system includes an inline flow control assembly and a flow meter assembly. The flow meter system regulates a maximum flow rate based on interchangeable differently sized elongated flow members and interchangeable plates with differently sized plate orifices that correspond to the differently sized elongated flow members. As such, the elongated flow members and the plate are configured for a quick and easy changing such that the maximum flow rate may be adjusted without changing an entire inline flow control assembly.

The inline flow control assembly may be fluidly coupled to a supply pipe that supplies a fluid and to an outlet pipe in which the maximum fluid flow rate for the current sized elongated flow member and the sized plate orifice is regulated into the outlet pipe. As such, the flow meter system may be used within various types of recirculating and non-recirculating coolant systems, and may be used in fluid transfer systems such as those found in manufacturing, chemical applications, or in agriculture.

The inline flow control assembly includes a housing, the elongated flow member, such as a flow pin, and a piston that includes a plate with a plate orifice. The components of the inline flow control assembly have a coaxial arrangement or a relationship along the same axis such that a fluid flow path is produced when a fluid enters the inline flow control assembly via an inlet and exits via an outlet in a generally linear or axial fluid flow path. The axial flow path eliminates any forces that are not axial thus eliminating the need for additional components, honing, and the like, to counteract non-axial forces, which results in much improved accuracy.

The housing includes a first portion that has an inlet and a second portion that includes an outlet. A fluid passage extending through the first and second portions fluidly couple the inlet to the outlet. The elongated flow member includes a proximate end and a distal end. The distal end is tapered inwardly with respect to an axis of movement of the inline flow control assembly and, as such, extends into the axial fluid passage. The plate includes the plate orifice, which is sized to fit the tapered distal end of the elongated flow member. The piston moves or travels along the common axis between a no flow or closed position, a plurality of intermediate open positions, and a full flow or fully opened position. Fluid pressure pushing onto the piston from the inlet moves the piston between from the no flow position to the full flow position.

In the no flow position, an outer peripheral of a flow member portion of the elongated flow member is positioned to engage with an inner opening surface of the plate orifice to prevent fluid from entering the plate orifice. In the full flow position, the outer peripheral of the flow member portion of the elongated flow member is disengaged, or spaced apart, from the inner opening surface of the plate orifice such that the fluid may pass through the plate orifice. The size or diameter of the outer peripheral of the flow member portion of the elongated flow member and the size or diameter of the plate orifice have a direct relationship on a fluid flow rate. That is, the smaller the plate orifice, the smaller the flow rate of the fluid exiting the plate orifice. Further, the larger the outer peripheral of the flow member portion of the elongated flow member, the smaller the flow rate of the fluid exiting the plate orifice.

Referring initially to FIG. 1, embodiments of an inline flow meter system are generally illustrated at 10. The inline flow meter system 10 includes an inline flow control assembly 12 and a flow meter assembly 14. The inline flow control assembly 12 includes a housing 16. The housing 16 includes a first portion 18 and a separate second portion 20 that may be coupled to the first portion 18, as described in greater detail herein.

The first portion 18 includes an inlet 22 and the second portion 20 includes an outlet 24. In some embodiments, each of the first and second portions 18, 20 are generally a frustoconical shape. The second portion 20 has a housing diameter D'1 that houses various components of the inline flow control assembly 12, as described in greater detail herein. In other embodiments, each one or both of the first and second portions 18, 20 may be several shapes including a cylindrical shape, a hexagonal shape, a rectangular shape, and the like. Further, in some embodiments, the shapes of the first and second portions 18, 20 are uniform. In other embodiments, the shapes of the first and second portions 18, 20 are irregular. In some embodiments, the shapes of the first and second portions 18, 20 are similar. In other embodiments, the shapes of the first and second portions 18, 20 are dissimilar. Further, in some embodiments, the second portion 20 has a greater area, is larger, and the like, than the first portion 18.

Figure 3:
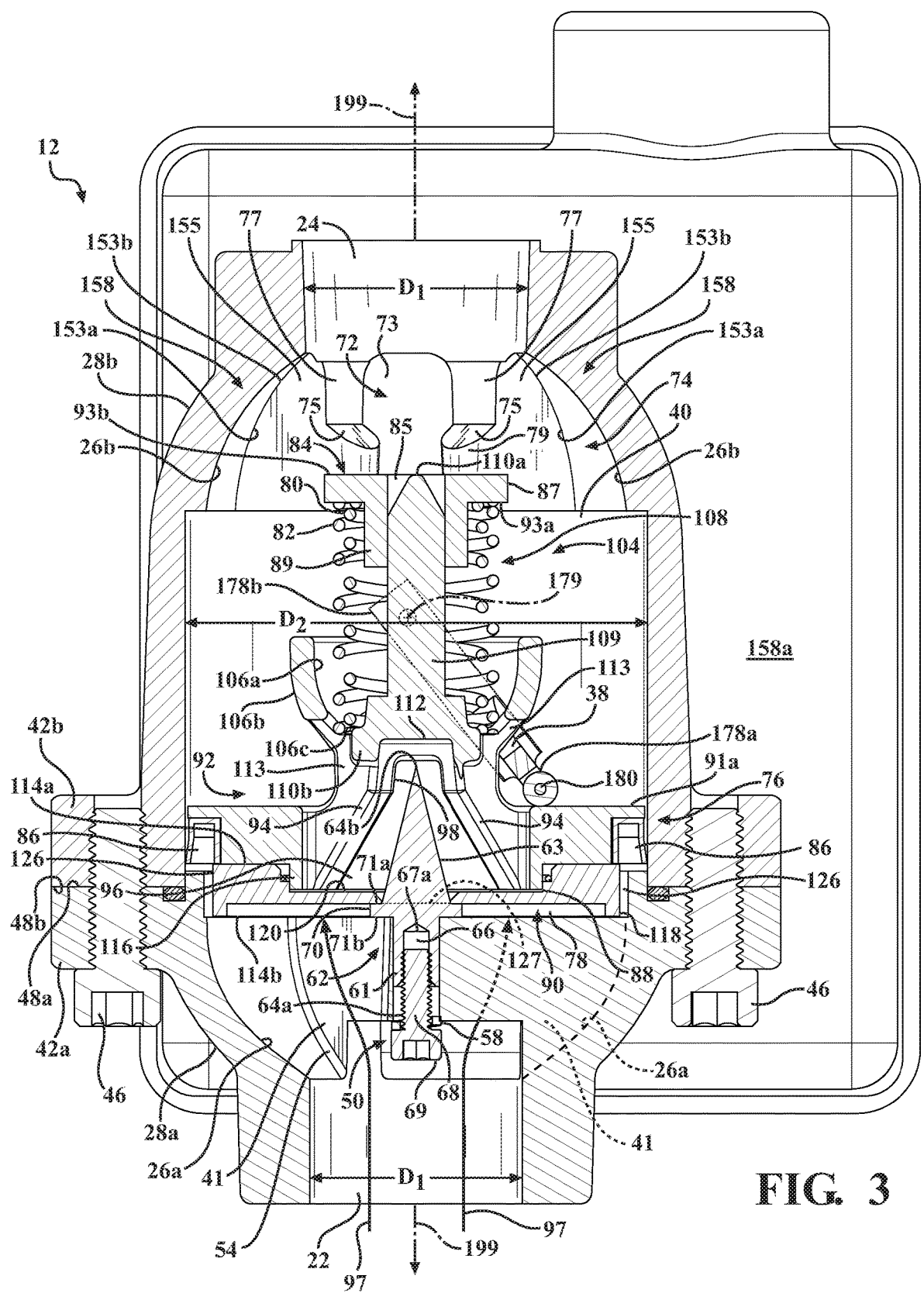
FIG. 3 schematically depicts a cross sectional view of the inline flow control assembly from the inline flow meter system of FIG. 1 taken from line A-A illustrating a piston in a no flow position, according to one or more embodiments shown or described herein.
Figure 4:
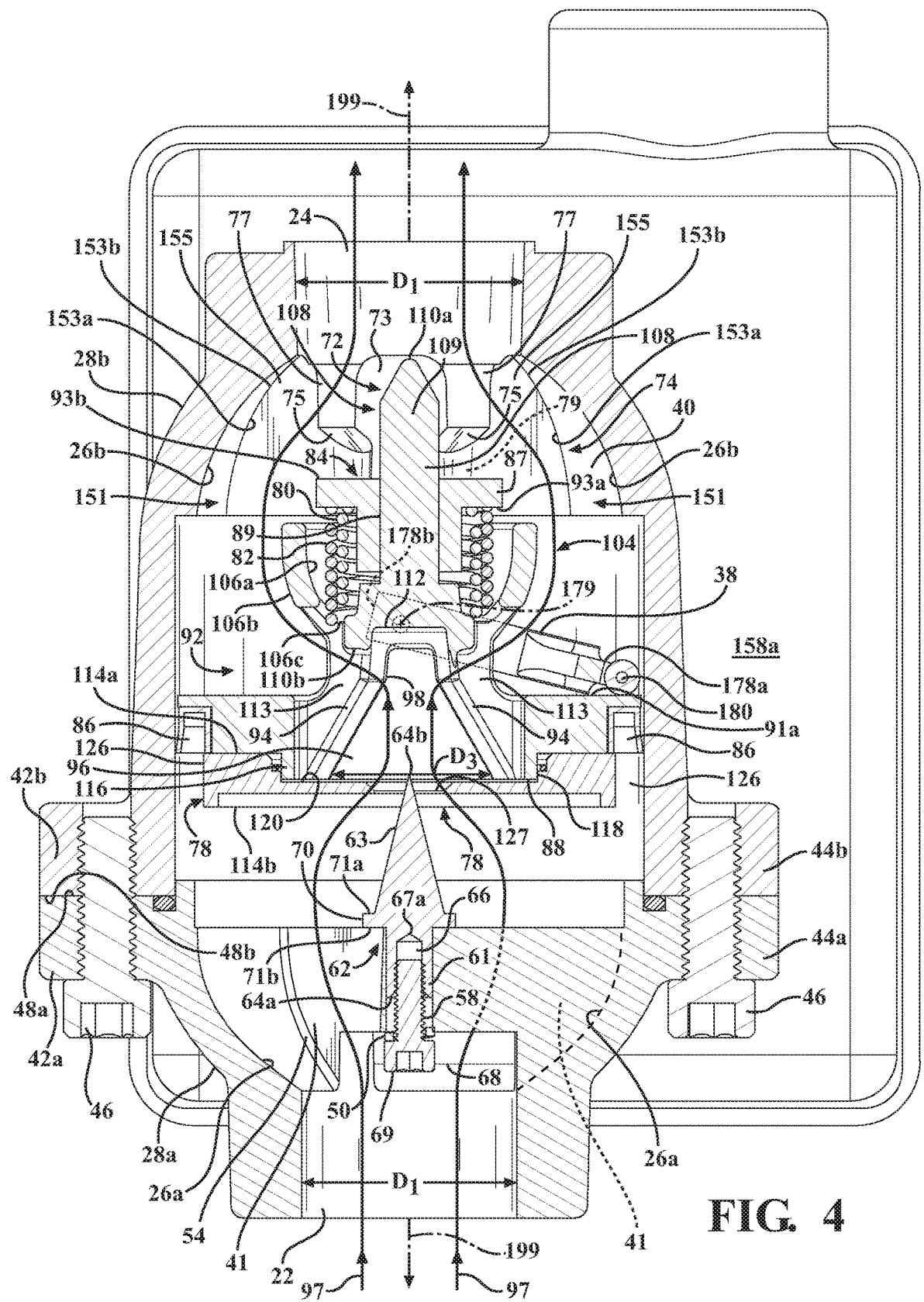
FIG. 4 schematically depicts a cross sectional view of the inline flow control assembly from the inline flow meter system of FIG. 1 taken from line A-A illustrating a piston in a full flow positon, according to one or more embodiments shown or described herein.
Figure 5:
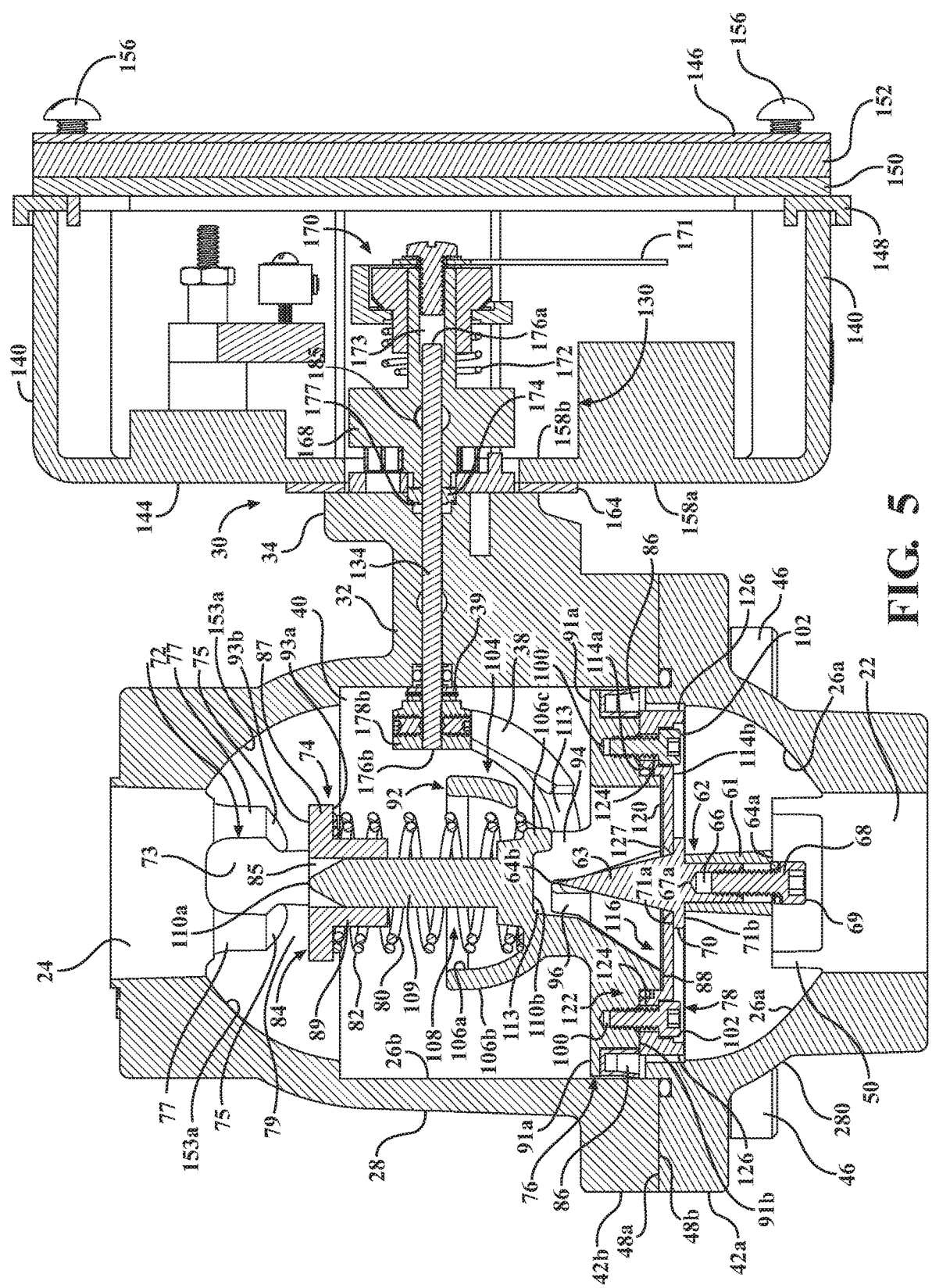
FIG. 5 schematically depicts a cross sectional view of the inline flow meter system of FIG. 1 taken from line B-B, according to one or more embodiments shown or described herein.

Each of the first and second portions 18, 20 include an inner surface 26a, 26b, as shown in FIGS. 3-5, and opposite outer surfaces 28a, 28b. The outer surface 28b of the second portion 20 includes a bracket assembly 30 mounted thereon. The bracket assembly 30 mounts the flow meter assembly 14 to the inline flow control assembly 12. The bracket assembly 30 includes a mounting portion 32 and a planar wall portion 34. The planar wall portion 34 extends from the mounting portion 32 and includes a plurality of bracket bores 36 configured to attach the second portion 20 of the housing 16 to the flow meter assembly 14. In some embodiments, the mounting portion 32 is integrally formed from the second portion 20 of the housing 16. As such, in this embodiment, the planar wall portion 34 is coupled to the mounting portion 32 via at least one mounting fastener. The mounting fastener may be a bolt, a screw, a rivet, and the like. It should be appreciated that the orientation, size, thickness and other dimensions of the bracket assembly 30 provide the necessary clearance for an arm 38 of the flow meter assembly 14 to measure a fluid flow rate through the inline flow control assembly 12, as discussed in greater detail below.

Referring to FIG. 5, the second portion 20 includes a housing opening 39 for the arm 38 to extend from the flow meter assembly 14 into an axial fluid passage 40 defined by the first and second portions 18, 20 and which extends between the inlet 22 and the outlet 24 as discussed in greater detail below. In some embodiments, the housing opening 39 is disposed within, or passes through the mounting portion 32 of the bracket assembly 30. In other embodiments, the housing opening 39 is positioned anywhere within the second portion 20 of the housing 16.

Referring back to FIG. 1, each of the first and second portions 18, 20 of the housing 16 include a flange 42a, 42b that extends from the outer surface 28a, 28b of each of the first and second portions 18, 20. Each of the flanges 42a, 42b circumferentially extend around the outer surface 28a, 28b and are positioned at an end of the first and second portions 18, 20 opposite of the inlet 22 and the outlet 24 respectively.

Referring to FIGS. 1-5, the flange 42a of the first portion 18 includes a plurality of flange bores 44a that are configured for a plurality of flange fasteners 46, such as bolts, screws, rivets and the like. In some embodiments, the plurality of flange bores 44a are through bores such that each of the plurality of flange fasteners 46 passes through. In other embodiments, the plurality of flange bores 44a are threaded such that each one of the plurality of flange fasteners 46 is threaded into each of the plurality of flange bores 44a. The flange 42b of the second portion 20 includes a plurality of corresponding flange bores 44b that are configured to receive the plurality of flange fasteners 46. In some embodiments, the corresponding plurality of flange bores 44b are through bores such that each one of the plurality of flange fasteners 46 passes through. In other embodiments, the corresponding plurality of flange bores 44b are threaded such that each one of the plurality of flange fasteners 46 is threaded into each one of the corresponding plurality of flange bores 44b.

Referring to FIGS. 2-5, each flange 42a, 42b of the first and second portions 18, 20 includes a mating surface 48a, 48b respectively. It is understood that the mating surface 48a of the first portion 18 is configured to abut the mating surface 48b of the flange 42b of the second portion 20. In this position, the flanges 42a, 42b are coupled together by the plurality of flange fasteners 46. In this configuration, the first and second portions 18, 20 fluidly couple the inlet 22 to the outlet 24 via the axial fluid passage 40 along an axis 199. That is the inlet 22 and the outlet 24 are coaxially aligned along with the axial fluid passage 40 along the axis 199. As such, the inner surfaces 26a, 26b of the first and second portions 18, 20 form the axial fluid passage 40 when the flanges 42a, 42b are coupled. It should be appreciated that the axial fluid passage 40 has a fluid passage diameter D2. The fluid passage diameter D2 is generally equal to or larger than the diameter D1 of the inlet 22 and outlet 24. As such, it should be appreciated that the inline flow control assembly 12, in some embodiments, has a fluid output ranging between 5 gallons per hour to 30 gallons per minute.

In some embodiments, as shown in FIGS. 2-5, an insert 50 extends from the inner surface 26a of the first portion 18 of the housing 16. In some embodiments, the insert 50 is formed as a one piece monolithic structure with the inner surface 26a of the first portion. In some other embodiments, the insert 50 is inserted into the first portion 18 so as to abut the inner surface 26a of the first portion 18. The insert 50 includes a circular frame 52 and three legs 54 that extend radially inward from the circular frame 52. In some embodiments, there may be more or less legs. Each leg 54 is spaced apart and extend from an inside surface 56a of the circular frame 52 into the axial fluid passage 40. The space or gap between each leg 54 forms a fluid opening 41 which at least partially defines a portion of the axial fluid passage 40. An aperture 58 is positioned in a center position or junction of the three legs 54. That is, the aperture 58 may be positioned at the center point where the three legs 54 intersect within the axial fluid passage 40. An insert sealing member 60 may be positioned between an outer surface 56b of the circular frame 52 of the insert 50 and the inner surface 26a of the first portion 18. The insert sealing member 60 may be an O-ring, a rubber, an epoxy, and the like.

Figure 11:
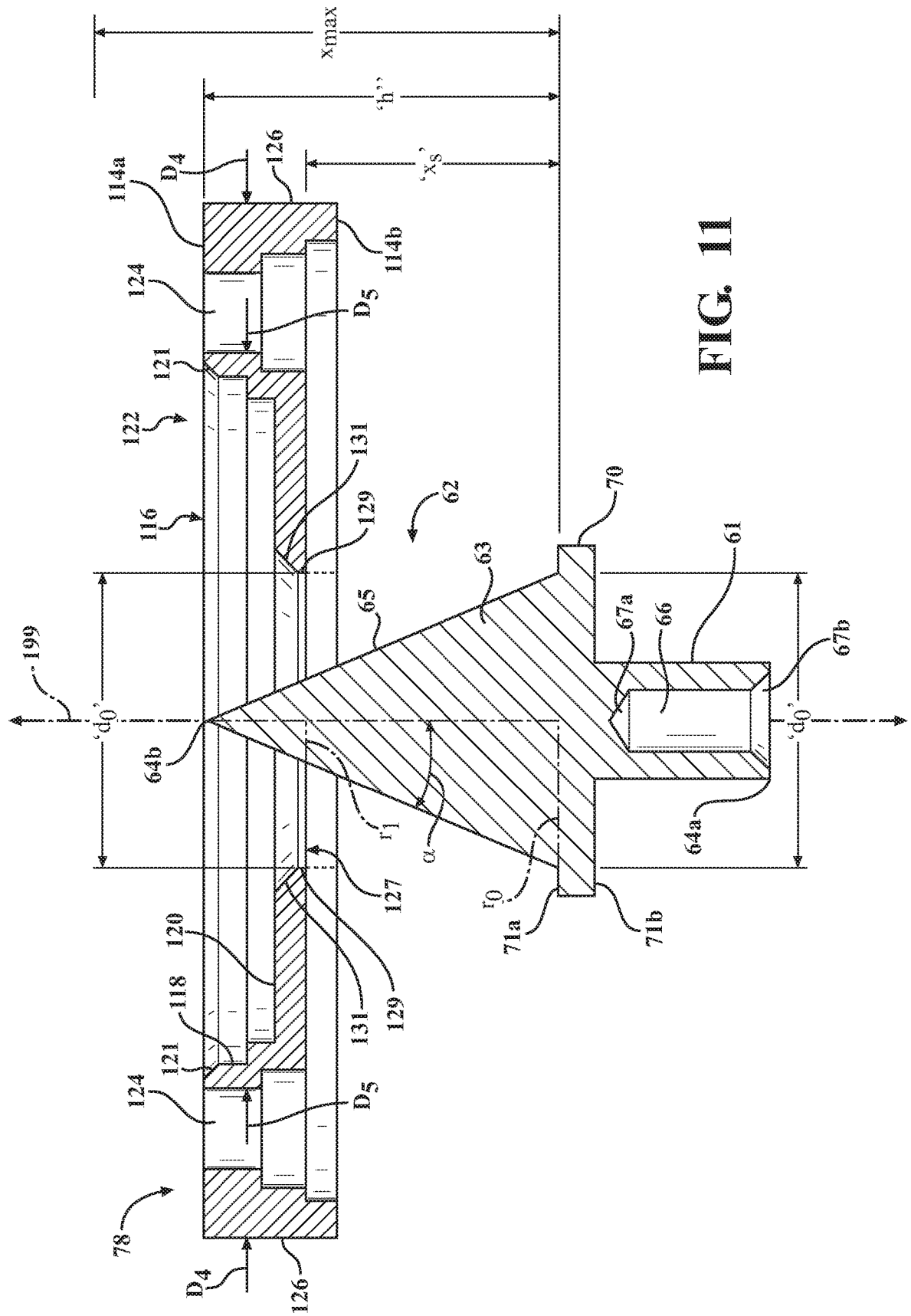
FIG. 11 schematically depicts an isolated cross sectional view of an elongated flow control member and a plate orifice of a plate of the inline flow control assembly of FIG. 4, according to one or more embodiments described herein.

Referring to FIGS. 2-5 and 11, an elongated flow member 62 includes a shaft portion 61 having a flow member proximate end 64a and a fluid flow portion 63 having a flow member distal end 64b is provided. The shaft portion 61 is coupled to the aperture 58 of the insert 50 via a flow fastener 68. That is, in some embodiments, a portion of the shaft portion 61 of the elongated flow member 62 is inserted into the aperture 58 of the insert 50. The shaft portion 61 includes an elongated flow member bore 66 extending from the proximate end 64a. The elongated flow member bore 66 includes a first chamfered portion 67a and a second chamfered portion 67b, as shown in FIG. 11.

The elongated flow member bore 66 is configured to receive the flow fastener 68. The flow fastener 68 may include a bolt, a screw, a rivet and the like. Further, the flow fastener 68 may have a head 69, which is larger than the aperture 58 of the insert 50. In some embodiments, the elongated flow member bore 66 is internally threaded such that the flow fastener 68 is threaded into the elongated flow member bore 66. In some other embodiments, the elongated flow member bore 66 is omitted and the shaft portion 61 is externally threaded so as to receive the flow fastener 68 in the form of a nut to retain the elongated flow member 62 within the aperture 58 of the insert 50.

As such, once a portion of the shaft portion 61 of the elongated flow member 62 is positioned within the aperture 58 of the insert 50, the flow fastener 68 is positioned within the elongated flow member bore 66, which couples the elongated flow member 62 to the insert 50. That is, the flow fastener 68 may pass through the aperture 58 of the insert 50 and into the elongated flow member bore 66 to couple the elongated flow member 62 to the insert 50. It should be understood that the elongated flow member 62 is held stationary in the axial fluid passage 40 by the flow fastener 68 and the insert 50.

In the coupled position, at least a portion of the fluid flow portion 63, including the flow member distal end 64*b*, is provided within the axial fluid passage 40. That is, the elongated flow member 62 extends axially along the axis 199 from the insert 50 into the axial fluid passage 40 such that at least the flow member distal end 64*b* is positioned within the axial fluid passage 40. In some embodiments, an annular ring 70 extends radially outward from a portion of the elongated flow member 62 between the fluid flow portion 63 and the shaft portion 61. Specifically, the annular ring 70 is positioned between the flow member distal end 64*b* and the proximate end 64*a*. The annular ring 70 defines the fluid flow portion 63 from the shaft portion 61. The annular ring 70 includes an upper surface 71*a* and an opposite lower surface 71*b*. The annular ring 70 may be positioned such that when the elongated flow member 62 is inserted and seated into the aperture 58 of the insert 50, the lower surface 71*b* of the annular ring 70 abuts an upper surface 56*c* of the insert 50.

Figure 9:
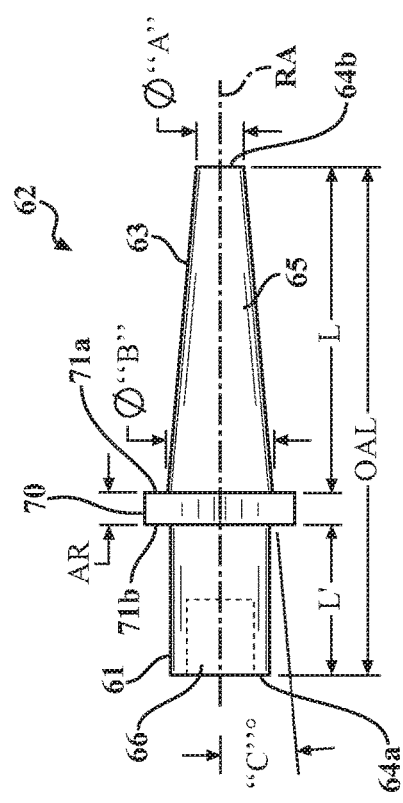
FIG. 9 schematically depicts an isolated side view of an elongated flow member of FIG. 2, according to one or more embodiments described herein.

It should be appreciated that in some embodiments, the fluid flow portion 63 of the elongated flow member 62 is positioned between the upper surface 71*a* of the annular ring 70 and the flow member distal end 64*b*. The fluid flow portion 63 may have a plurality of different diameters to influence a desired fluid flow rate of the inline flow meter system 10, as discussed in greater detail herein. That is, in some embodiments, the fluid flow portion 63 may have a uniform diameter extending from the upper surface 71*a* to the flow member distal end 64*b*. In other embodiments, the size of the diameter of the fluid flow portion 63 may taper, as the flow portion extends from the upper surface 71*a* of the annular ring 70 to the flow member distal end 64*b*. Further, in some embodiments, the fluid flow portion 63 terminates such that the flow member distal end 64*b* has a planar end surface, as shown in FIG. 9. As such, it should be appreciated that a plurality of elongated flow members 62 having differently sized shapes, tapers, and/or diameters may be received within the insert 50.

As such, each elongated flow member 62 is interchangeable with a plurality of elongated flow members, which each having a differently sized diameter fluid flow portion 63 and/or flow member distal end 64*b* to change the fluid flow rate of the inline flow meter system 10, as discussed in greater detail herein. In other embodiments, the fluid flow portion 63 and/or the flow member distal end 64*b* of the elongated flow member 62 is tapered inwardly with respect to the axis 199 to influence the desired fluid flow rate of the inline flow meter system 10, as discussed in greater detail herein. It should be appreciated that the elongated flow member 62 may be a flow pin.

Referring to FIG. 9, the fluid flow portion 63 and the flow member distal end 64*b* of the elongated flow member 62 will be described in greater detail. In some embodiments, the fluid flow portion 63 of each of the elongated flow members 62 includes a length L, a length L', an annular ring 70 thickness AR, an overall length OAL, an ending diameter A, a starting, or base diameter B, a reference axis RA, and a tapered angle C.

The length L is between the upper surface 71*a* of the annular ring 70 and the flow member distal end 64*b*. The length L' is between the lower surface 71*b* of the annular ring 70 and the flow member proximate end 64*a*. The annular ring thickness AR is a thickness between the upper surface 71 and the lower surface 71*b* of the annular ring 70. The overall length OAL is a length of the elongated flow member 62 taken between the flow member proximate end 64 and the flow member distal end 64*b*. Specifically, the overall length OAL is sum of the length L' the annular ring thickness AR and the length L.

The ending diameter A is a diameter of the flow member distal end 64*b* of the fluid flow portion 63. In some embodiments, the flow member distal end 64*b* may be formed as a planar end surface of the fluid flow portion 63. The base diameter B is a diameter of the fluid flow portion 63 taken at the junction of the upper surface 71*a* of the annular ring 70 and the fluid flow portion 63. The reference axis RA extends a longitudinal axis of the elongated flow member 62 between the flow member proximate end 64*a* and the flow member distal end 64*b*. The tapered angle C is an angle between the reference axis RA and an outer peripheral surface 65 of the fluid flow portion 63.

It should be understood that each elongated flow member 62 may have a differently sized length L, ending diameter A, starting or base diameter B and/or tapered angle C. As such, it is understood that the length L, the ending diameter A, the starting or base diameter B and/or the tapered angle C influence the fluid flow rate, as described in greater detail herein.

Now referring to FIGS. 9 and 10A-10B, it should be understood that, in some embodiments, with respect to the inline flow control assembly 12, the length L is between 0.750 inches and 0.875 inches, as illustrated in the table of FIG. 10B. In other embodiments, the length L is greater than 0.875 inches and/or less than 0.750 inches. It should be understood that, in some embodiments, with respect to the inline flow control assembly 12, the ending diameter A is between 0.00 inches to 0.248 inches, as illustrated in the tables of FIG. 10A. Further, in other embodiments, the ending diameter A is greater than 0.248 inches. That is, in some embodiments, the ending diameter A of the flow member portion 63 either terminates at a point (e.g., 0.00 inches, as best shown in FIG. 4) or terminates leaving a planar surface (e.g. not 0.00 inches, as best shown in FIG. 9). It should be appreciated that, in a non-limiting example, the elongated flow members 62 in which the ending diameter A terminates at 0.00 inches may generally support high flow applications (i.e., 5 gallons per minute (GPM)-30 GPM) while the elongated flow members 62 in which the ending diameter A terminates at a value greater than 0.00 inches may generally support low flow applications (i.e., 5 gallons per hour (GPH)-15 GPH), as discussed in greater detail herein. It should be understood that the high flow applications may be greater than 30 GPM and/or less than 5 GPH. For example, pins 1 to 40 of FIG. 10A may support a 2.0 GPM application, pins 41-65 of FIG. 10A may support a 1.5 GPM applications, pins 66-83 of FIG. 10A may support a 1.0 GPM application, and the like.

It should be understood that, in some embodiments, with respect to the inline flow control assembly 12, the starting, or base diameter B is between 0.124 inches to 0.877 inches. In other embodiments, the starting or base diameter B is greater than 0.877 inches and/or less than 0.124 inches. Additionally, it should be understood that, in some embodiments, with respect to the inline flow control assembly 12, the tapered angle C is between 0.088 degrees to 30.130 degrees taken from the reference axis RA, as illustrated in the table of FIG. 10A. In other embodiments, the tapered angle C is greater than 30.130 degrees and/or less than 0.088 degrees.

It should be understood that the L' and the thickness AR are each a constant, or are common amongst the different, or interchangeable elongated flow members. In these embodiments, the length L' is 0.38 inches. It is understood that this is nonlimiting and the length L' may be less than or greater than 0.38 inches. Further, in these embodiments, the annular ring thickness AR is 0.075 inches. It is understood that this is nonlimiting and the annular ring thickness AR may be less than or greater than 0.075 inches. Further, the annular ring 70 may extend from the outer surface 65 of the fluid flow portion 63 of the elongated flow members 62 between 0.38 inches to 1.00 inches. It is understood that this is nonlimiting and the annular ring 70 may extend less than 0.38 inches or more than 1.0 inches from the fluid flow portion 63.

Referring back to FIGS. 3-4, the inner surface 26b of the second portion 20 of the housing 16 includes a piston guide member 72 and an outlet flow directional wall 151 disposed within the axial fluid passage 40. In some embodiments, the outlet flow directional wall 151 includes an inner surface 153a and an opposite outer surface 153b that is spaced apart from the inner surface 26b of the second portion 20 of the housing 16. As such, the inner surface 153a of the outlet flow directional wall 151 forms an outlet flow directional aperture 155 that directs a fluid flow 97 from the axial fluid passage 40 to the outlet 24. In some embodiments, the outlet flow directional wall 151 circumferentially surrounds the piston guide member 72. In some other embodiments, the outlet flow directional wall 151 is offset from the axis 199 and a piston 74, as described in greater detail below.

The piston guide member 72 fluidly communicates the outlet 24 with the axial fluid passage 40. In some embodiments, the piston guide member 72 may include a channel 73 positioned within a wall 77 and a plurality of spaced apart finger members 79 that include a planar surface 75. The plurality of spaced apart finger members 79 are spaced apart and, in some embodiments, extend from the wall 77 towards the axial flow passage 40. In other embodiments, the plurality of spaced apart finger members 79 extend from the outer surface 26b inward towards the axial flow passage 40. The channel 73 extends along the axis 199 from the outlet 24 towards the inlet 22. The channel 73 receives at least a portion of an elongated spring member 108 to guide the piston 74 along the axis 199 between the no flow position, as best seen in FIG. 3, and the full flow position, as best seen in FIG. 4, and as discussed in greater detail herein.

Referring now to FIGS. 2-5, the piston 74 includes a body member 76, a plate 78, an inner spring 80, an outer spring 82, a retainer member 84, a piston sealing member 86, a plate sealing member 88, and an elongated spring member 108. The body member 76 includes a base portion 90 and a spring retainer portion 92 positioned axially from the base portion 90 and is supported by a plurality of spaced apart support members 94 that extend between the base portion 90 and the spring retainer portion 92. In some embodiments, the base portion 90, spring retainer portion 92, and plurality of support members 94 are integrally molded as a one piece monolithic structure. In other embodiments, the base portion 90, spring retainer portion 92, and plurality of support members 94 are coupled together.

In some embodiments, the base portion 90 is generally circular and is an inverse frustoconical shape, with reference to the outlet 24. The base portion 90 has a piston bore 96 extending therethrough forming a piston fluid passage within an inner surface 98 of the piston bore 96. That is, the body member 76 includes an upper surface 91a and an opposite inner surface 91b in which the inner surface 91b generally tapers towards the inlet 22 and the piston bore 96 extends between the upper surface 91a and the inner surface 91b. In other embodiments, the base portion 90 is generally circular and includes a series of steps that reduce in diameter from the upper surface 91a to the inner surface 91b. The piston bore 96 has a piston bore diameter D3 at the widest portion adjacent to the plate 78. In some embodiments, the piston bore D3 is less than the axial fluid passage diameter D2 such that the piston 74 moves within the axial fluid passage 40 and a fluid flow 97 travels through the piston bore 96 and the axial fluid passage 40 along the axis 199. That is, the fluid flow 97 travels from the inlet 22, through the piston bore 96 through the axial fluid passage 40 and through the outlet 24 along the axis 199.

The plurality of support members 94 extend from the inner surface 91b within the piston bore 96 in a curvilinear or arcuate direction such that the spring retainer portion 92 is axially aligned with the piston bore 96. A pair of plate body receiving cavities 100 are positioned within the inner surface 91b of the body member 76, as shown in FIG. 5. In some embodiments, each of the plate body receiving cavities 100 each receive a plate fastener 102, as discussed in greater detail below.

Referring to FIGS. 2-5, the spring retainer portion 92 is generally circular and includes a continuous wall portion 104 that has an interior wall surface 106a, an opposite exterior wall surface 106b and a floor 106c. In some embodiments, a diameter of the continuous wall portion 104 becomes smaller as the continuous wall portion 104 approaches the floor 106c. As such, the continuous wall portion 104 is tapered outwardly with respect to the outlet 24 and may have a generally frustoconical shape.

An elongated spring member 108 extends axially from the floor 106c. The elongated spring member 108 has spring member guide portion 109 positioned between a spring member distal end 110a and a spring member proximate end 110b. As such, the spring member proximate end 110b extends from the floor 106c. A portion of the spring member guide portion 109 of the elongated spring member 108 is contained within the continuous wall portion 104 and a portion of the spring member guide portion 109 extends beyond the continuous wall portion 104 in the axial direction 199. The elongated spring member 108 extends in a direction opposite of the base portion 90 such that the spring member distal end 110a terminates at a positon beyond the continuous wall portion 104. In some embodiments, the elongated spring member 108 is integrally formed from the floor 106c of the spring retainer portion 92. In other embodiments, as illustrated in FIGS. 3-5, the floor 106c includes a receiving cavity 112. In this embodiment, the spring member proximate end 110b is received within the receiving cavity 112.

In some embodiments, a portion of the spring member guide portion 109 and/or the spring member distal end 110a is tapered inwardly with respect to the axis 199. In other embodiments, the spring member guide portion 109 and/or the spring member distal end 110a maintains a uniform diameter. That is, in some embodiments, the spring member guide portion 109 has a uniform diameter. Further, in some embodiments, the spring member distal end 110a is configured to be received within the retainer member 84, as discussed in greater detail herein.

As such, in some embodiments, the retainer member 84 includes a flange 87 that extends radially from a body portion 89. The flange 87 includes an inner surface 93*a* and an opposite outer surface 93*b*. An opening 85 extends through the body portion 89. The opening 85 of the retainer member 84 receives the spring member distal end 110*a* as the spring member distal end 110*a* passes through the retainer member 84 and is received in the channel 73 of the piston guide member 72 when the piston 74 moves from the no flow position, as best seen in FIG. 3, to the full flow position, as best shown in in FIG. 4, and as discussed in greater detail herein. In embodiments, the spring member distal end 110*a* and the retainer member 84 are coupled as a slip joint such that the travel or movement of the piston 74, including the elongated spring member 108 through the retainer member 84, is along the axis 199.

The floor 106*c* of the spring retainer portion 92 further includes a plurality of openings 113. In some embodiments, the plurality of openings 113 are circumferentially arranged around the floor 106*c* at the interior wall surface 106*a* and extend through the floor 106*c* of the spring retainer portion 92. The plurality of openings 113 allow the fluid flow 97 from the piston bore 96 to pass through the spring retainer portion 92 in the along the axis 199, as discussed in greater detail herein.

The inner spring 80 is positioned within the interior wall surface 106*a* of the continuous wall portion 104 of the spring retainer portion 92 between the floor 106*c* and the retainer member 84. The inner spring 80 circumferentially surrounds the elongated spring member 108 between the spring member proximate end 110*b* and the spring member distal end 110*a*. The outer spring 82 is also positioned within the interior wall surface 106*a* of the continuous wall portion 104 of the spring retainer portion 92 between the floor 106*c* and the retainer member 84. The outer spring 82 circumferentially surrounds the inner spring 80 and the elongated spring member 108 between the spring member proximate end 110*b* and the spring member distal end 110*a*. As such, the inner and outer springs 80, 82 each extend lengthwise in the axial direction 199.

It should be appreciated that in the no flow position, the outer surface 93*b* of the retainer member 84 is biased against or in contact with the planar surfaces 75 of the plurality of fingers 79, as shown in FIG. 3. In the plurality of intermediate flow positions and in the full flow position, the outer surface 93*b* of the retainer member 84 is driven into the planar surface 75 of the plurality of fingers 79 such that the retainer member 84 exerts a force on the inner and outer springs 80, 82. As such, the inner and outer springs 80, 82 are compressed to counterbalance a displacement of the piston 74 along the axis 199 while at least the spring member distal end 110*a* extends through the opening 85 of the retainer member 84 and into the channel 73 of the piston guide member 72. As such, the force of the fluid at the inlet 22 needs to overcome the force of the inner and outer springs 80, 82 to displace the piston 74 such that the piston guide member 72 receives the portion of the elongated spring member 108 based on a fluid flow force that is in the direction of the axis 199. Further, it is understood that the space between the plurality of fingers 79 permits the fluid flow 97 to travel through the axial fluid passage 40 around the plurality of fingers 79 via the space and into the outlet 24.

Referring to FIGS. 2-5, in some embodiments, the outer spring 82 has a larger diameter than the inner spring 80. Further, in some embodiments, the outer spring 82 is generally larger in coil size, length, and diameter. The inner and outer springs 80, 82 biases the body member 76 of the piston 74 between the insert 50 of the first portion 18 and the piston guide member 72 and outlet 24 of the second portion 20 such that the piston 74 moves, under fluid pressure, as discussed in greater detail herein. That is, a displacement by the inner and outer springs 80, 82 counteract linear or axial forces exerted on the piston 74 by the fluid flow 97, which causes the piston 74 to move between the no flow position and the full flow position, as discussed in greater detail herein. In some embodiments, the inner spring 80 has a greater spring constant than the outer spring 82. In other embodiments, the outer spring 82 has a greater spring constant that the inner spring 80. In yet other embodiments, the spring constant is equal between the inner and outer springs 80, 82.

The piston sealing member 86 is positioned between the plate 78 and the body member 76 such that the piston sealing member 86 encapsulates an outer surface 126 of the plate 78 when the plate 78 is coupled to the base portion 90 of the body member 76. In some embodiments, the piston sealing member 86 includes a U-shaped seal profile and a V-shaped resilient member portion such that the body member 76 is sealed during movement with a reduced friction, as discussed in greater detail herein. In some embodiments, the piston sealing member 86 is a Teflon composite. In other embodiments, the piston sealing member 86 is a rubber material, a composite material, an epoxy material, a plastic material, and/or the like.

Referring to FIGS. 2-5 and 11, the plate 78 is generally circular and includes a plate interior surface 114*a* and an opposite plate exterior surface 114*b* defining a thickness of the plate 78. As such, in some embodiments, the plate 78 may be substantially flat. The outer surface 126 of the plate 78 defines a plate diameter D4 that extends between all sides of the generally circular outer surface 126 of the plate.

The plate 78 includes a recess 116 that is open to the plate interior surface 114*a*. In some embodiments, a portion of the recess 116 that opens to the plate interior surface 114*a* is chamfered 121. Further, in some embodiments, the recess 116 is circular. In other embodiments, the recess 116 is hexagonal, octagonal, square, and the like. The recess 116 defines a diameter D5. The diameter D5 is smaller than the plate diameter D4. The recess 116 extends at least partially from the plate interior surface 114*a* towards the plate exterior surface 114*b*. As such, the recess 116 has an inner wall 118 that is generally circular and is formed from the thickness of the plate 78.

The recess 116 further includes a plate floor 120. In some embodiments, the inner wall 118 of the recess 116 includes a stepped portion 122. As such, the stepped portion 122 extends from the plate interior surface 114*a* towards the plate exterior surface 114*b*. As the recess 116 extends from the plate interior surface 114*a* towards the plate exterior surface 114*b*, the recess diameter D5 becomes smaller at one distinct point forming the stepped portion 122. The stepped portion 122 provides a nest or locating position for the plate sealing member 88, such as a plate O-ring, a gasket, an epoxy and the like.

Referring to FIGS. 5 and 11, the plate 78 further includes a pair of plate bores 124 that extend through the plate interior and exterior surfaces 114*a*, 114*b*. In some embodiments, the pair of plate bores 124 are positioned between the outer surface 126 and the inner wall 118 of the recess 116. The pair of plate fasteners 102 extend through each of the pair of plate bores 124 and are received within the pair of plate body receiving cavities 100. The pair of plate fasteners 102 may be bolts, screws, rivets, and the like. As such, the pair of plate fasteners 102 couple the plate to the body member 76 such that the recess 116 of the plate 78 receives the inner surface 91b of the base portion 90 of the body member 76 of the piston 74.

Now referring to FIG. 11, the plate floor 120 includes a plate orifice 127. The plate orifice 127 extends axially through the plate floor 120 of the recess 116 along the axis 199, which is the same axial direction as the elongated flow member 62 and the piston 74 (FIG. 5). Further, the plate orifice 127 has an inner edge surface 129. In some embodiments, a portion 131 of the inner edge surface 129 is angled with respect to the outer peripheral surface 65 of the fluid flow portion 63 of the elongated flow member 62. Further, in some embodiments, the angled portion 131 of the inner edge surface 129 is complimentary to the outer peripheral surface 65 of the fluid flow portion 63 of the elongated flow member 62. It should be understood that the plate orifice 127 of the plate 78 may have a diameter $d_0$. As such, it is understood that the diameter $d_0$ of the plate orifice 127 influences the flow rate, as described in greater detail herein.

Further, it should be understood that the diameter $d_0$ of the plate orifice 127 corresponds to the beginning diameter B and/or the ending diameter A of the outer peripheral surface 65 of the fluid flow portion 63 of the elongated flow member 62, such that, in the no-flow position, the beginning diameter B, the ending diameter A, or a portion therebetween is positioned to engage with the inner edge surface 129 of the plate orifice 127 to prevent fluid from entering the plate orifice. In the full flow position, the outer peripheral surface 65 of the fluid flow portion 63 of the elongated flow member 62 is disengaged, or spaced apart, from the inner edge surface 129 of the plate orifice 127 such that the fluid flow 97 may pass through the plate orifice 127, as described in greater detail herein. Further, in the plurality of intermediate positions and/or in the full flow position, the elongated flow member 62 and the plate orifice 127 are each in a disengaged position such that the outer peripheral surface 65 and the inner edge surface 129 of the plate orifice 127 are spaced apart to permit fluid flow 97 from the inlet 22 (FIG. 4) to flow through the plate orifice 127.

It should be appreciated that the plate 78, including the plate orifice 127, directs the fluid flow 97 along the axis 199 such that the fluid flow 97 (FIG. 4) may only pass through the plate 78 via the plate orifice 127 when plate 78 is moved from the no flow position towards the full flow position.

As such, the size or the diameter $d_0$ of the plate orifice 127 corresponds to the outer peripheral surface 65 of the of the fluid flow portion 63. Specifically, the beginning diameter B, the ending diameter A, or a portion therebetween of the outer peripheral surface 65 of fluid flow portion 63 corresponds to the diameter $d_0$ of the opening or diameter of the inner edge surface 129 of the plate orifice 127, such that, as described above, in the no-flow position, the outer peripheral surface 65 of the fluid flow portion 63 engages with the inner edge surface 129 of the plate orifice 127 to prohibit the fluid flow 97 from passing through the plate orifice 127. Further, the diameter $d_0$ corresponds to the maximum flow rate along the axis 199 such that differently sized plate orifices 127 produce different maximum flow rates In some embodiments, the diameter $d_0$ of the plate orifice 127 is between 0.124 inches to 0.879 inches, as illustrated in the table of FIG. 12. In other embodiments, the diameter $d_0$ of the plate orifice 127 is greater than 0.879 inches and/or less than 0.124 inches. As such, it is understood that the flow rate may vary between 2.5 GPH to 30 gallons per minute GPM, depending on the diameter $d_0$ of the plate orifice 127 and the corresponding outer peripheral surface 65 of the fluid flow portion 63 of the elongated flow member 62, as described in greater detail above with respect to the beginning diameter B and the ending diameter A of the fluid flow portion 63 of the various elongated flow members 62. It should be understood that this is non-limiting and the flow rate may be less than 2.5 GPH and/or greater than 30 GPM.

It is understood that the plate orifice 127 of the plate 78 is positioned within the recess 116 of the plate 78 such that the plate orifice 127 extends from the exterior surface 114b to the plate floor 120 of the recess 116. The recess 116 and the stepped portion 122 provides a clearance for the flow member distal end 64b and the outer peripheral surface 65 of the fluid flow portion 63 to extend through the plate orifice 127 of the plate along the axis 199 between the no flow positon and the full flow position while providing a housing for the plate sealing member 88.

In some embodiments, the plate 78 and the plate orifice 127 may travel along the axis 199 from $x_s=0$ where the plate is in the no flow position to $x_s=x_{max}$, where $x_{max}$ represents the full travel of the piston 74 (FIG. 4) and consequently the full compression of the inner and outer springs 80, 82 (FIG. 4). That is, where $x_s=0$, the plate exterior surface 114b abuts or is in contact with the upper surface 71a of the annular ring 70 of the elongated flow member 62. Conversely, when $x_s=x_{max}$ the plate exterior surface 114b is in the maximum distance, or furthest position, along the axis 199 from the upper surface 71a of the annular ring 70 of the elongated flow member 62. It should be appreciated that the travel of the plate 78 and the piston 74 is limited to a compression force of the inner and outer springs 80, 82 of the piston 74. That is, the $x_{max}$ position is when the retainer member 84 contacts the planar surface 75 of the plurality of fingers 79 and compresses the inner and outer springs 80, 82 to a full compression, based on the strength of the inner and outer springs 80, 82, thereby moving the plate 78 to create an area between the outer peripheral surface 65 of the fluid flow portion 63 of the elongated flow member 62 and the plate orifice 127.

The area is generated between the plate orifice 127 and fluid flow portion 63 may mathematically be determined by the following example. In this example, $r_0$ is a radius of the beginning diameter B of the fluid flow portion 63 and $r_1$ is the ending diameter A of the fluid flow portion 63 of the elongated flow member 62 with alpha being the angle between the radius of the beginning diameter B and the outer peripheral surface 65 of the fluid flow portion 63. As such, the area created between the plate 78 and the outer peripheral surface 65 of the fluid flow portion 63 of the elongated flow member 62 has a direct effect on the fluid flow rate, as discussed in greater detail below.

Referring now to FIG. 3, the no flow position of the piston 74 and the plate 78 will be described. In the no flow position, the outer peripheral surface 65 of the fluid flow portion 63 of the elongated flow member 62 is positioned within the plate orifice 127 such that the outer peripheral surface 65 is in contact with, or engages with the inner edge surface 129 of the plate orifice 127. As such, the engagement of the outer peripheral surface 65 of the fluid flow portion 63 with the inner edge surface 129 of the plate orifice prohibits the fluid flow 97 from entering the plate orifice 127. That is, the fluid flow 97 from the inlet 22 cannot pass though the plate orifice 127 due to the plate orifice 127 being occulated or closed by the elongated flow member 62. It should be understood that this may occur when the fluid pressure from the inlet 22, as applied to the plate 78 and the piston 74, is not enough to overcome the spring force from the inner and outer springs 80, 82 to drive the piston 74 along the axis 199. As such, inlet fluid will not pass through the plate orifice 127 and the plate 78 will continue to make contact with or abut with the three legs 54 and/or the circular frame 52 of the insert 50. Further, it should be understood that the dashed line of the fluid flow 97 in FIG. 3 is passing between the leg 54 of the insert 50 and is illustrated behind the inner surface 26a of the first portion 18 of the housing 16.

Referring now to FIG. 4, the full flow position of the piston 74 and the plate 78 will be described. In the full flow position, or open position, the amount of force from the inlet fluid applied to the plate 78 and the piston 74 overcome the spring force of the inner and outer springs 80, 82 while allows for the plate 78 and the piston 74 to be driven along the axis 199 towards the outlet. As such, the elongated spring member 108 of the piston 74 is received within the channel 73 of the piston guide member 72 and the inner and outer springs 80, 82 are compressed to create a counter balance of the piston 74. With the plate 78 and the piston 74 advanced or removed a distance from the insert 50, the outer peripheral surface 65 of the fluid flow portion 63 of the elongated flow member 62 is disengaged, or spaced apart, from the inner edge surface 129 of the plate orifice 127 such that the fluid flow 97 may pass through the plate orifice 127, as described in greater detail herein. It should be appreciated that the plate 78 is not limited to movement into the full flow position. That is, the plate 78 may move or travel into or through a plurality of intermediate positions. As such, in any one of the plurality of intermediate positions, the plate 78 is advanced sufficiently to disengage contact between the plate orifice 127 and the elongated flow member 62 such that the outer peripheral surface 65 and the inner edge surface 129 of the plate orifice 127 are spaced apart enough to permit the fluid flow 97 from the inlet 22 (FIG. 4) to flow through the plate orifice 127. Further, it should be understood that the dashed line of the fluid flow 97 in FIG. 4 is passing between the leg 54 of the insert 50 and is illustrated behind the inner surface 26a of the first portion 18 of the housing 16.

As such, in the plurality of intermediate positions, and/or in the full flow position, the fluid flow 97 travels, generally along the axis 199, from the inlet 22 though the fluid openings 41 of the insert 50, through the plate orifice 127, through the piston bore 96 around or through portions of the continuous wall portion 104, into the axial fluid passage 40, into the outlet flow directional aperture 155 and exits through the outlet 24.

Now referring back to FIGS. 1-2 and 5, the flow meter assembly 14 will now be described. The flow meter assembly 14 includes a housing assembly 128, a dial assembly 130, a display device 132, an elongated arm member 134, and the arm 38. The housing assembly 128 includes an enclosure 138 having end walls 140, sidewalls 142, a rear wall 144 and a cover 146. In some embodiments, a housing sealing member 148, a backer plate 150 and a lens 152 may be positioned between the cover 146 and the end walls 140 and sidewalls 142 of the enclosure 138. The cover 146, housing sealing member 148, backer plate 150 and/or the lens 152 may each have corresponding openings 154 such that each of them may be coupled to the enclosure 138 via a plurality of cover fasteners 156. The cover fasteners 156 may include a bolt, a screw, a rivet, and the like.

In some embodiments, the cover 146, housing sealing member 148, backer plate 150 and/or the lens 152 may each have a portion that is transparent such that a user may see a display device 132 positioned within the enclosure 138. The display device 132 may be communicatively coupled to the dial assembly 130 such that a current flow rate may be displayed on the display device 132 and read by the user, as discussed in greater detail herein. The display device 132 may be an analog scale or a digital output of the flow rate.

The rear wall 144 includes an exterior surface 158a and an opposite inner surface 158b. A housing bore 160 and a plurality of housing openings 162 each extend through the outer and inner surfaces 158a, 158b. A housing bore sealing member 164 is positioned between the elongated arm member 134 and the exterior surface 158a. A plurality of sealing member openings 166 each extend through the housing bore sealing member 164 and align with, or corresponds to, the plurality of housing openings 162. As such, the housing bore sealing member 164 and the rear wall 144 of the enclosure 138 are coupled to the bracket assembly 30 of the second portion 20 by a plurality of housing fasteners. The plurality of housing fasteners may be bolts, screws, rivets, and the like.

Figure 2:
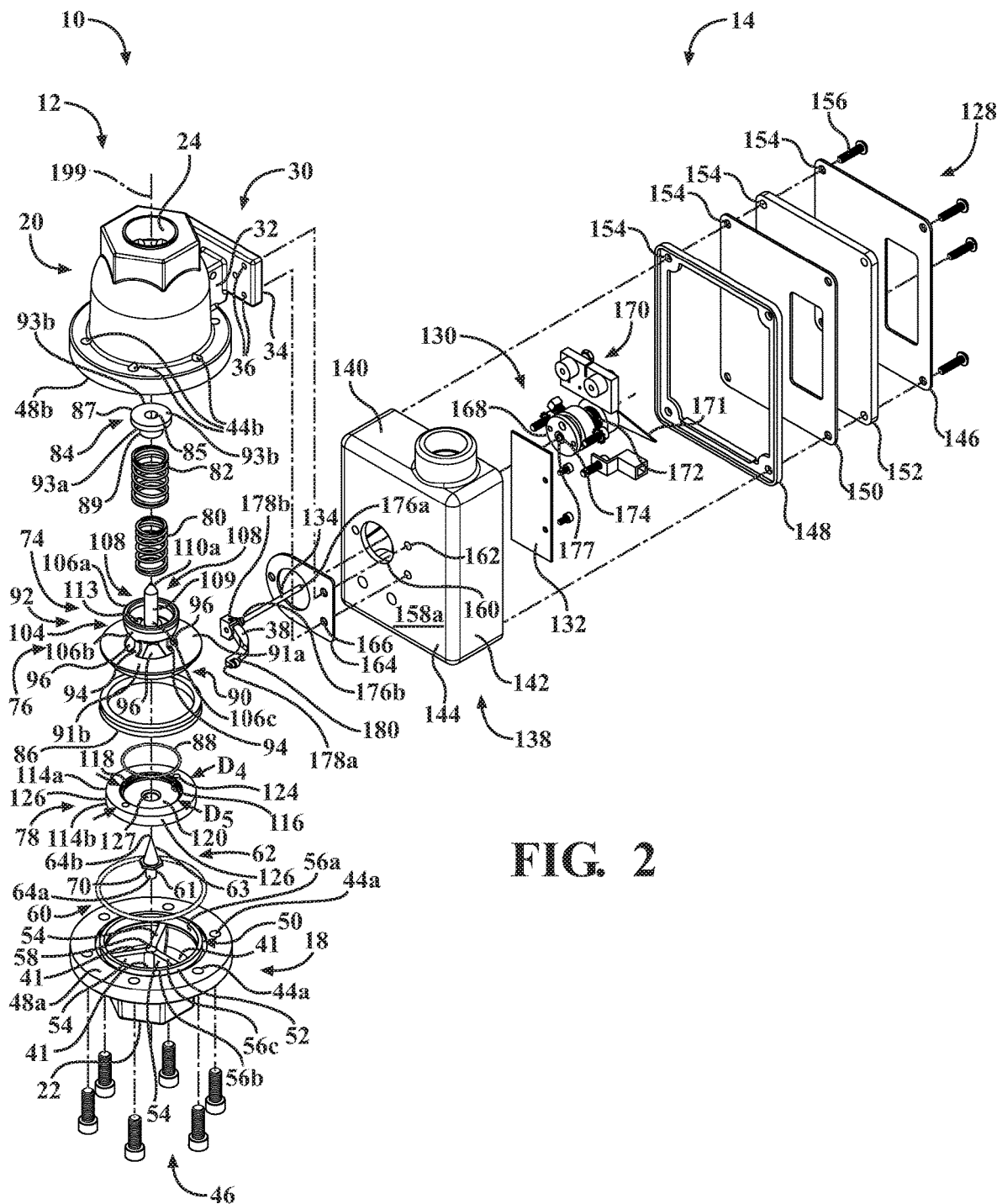
FIG. 2 illustrates a perspective exploded view of the inline flow meter system of FIG. 1, according to one or more embodiments shown or described herein.

Referring to FIGS. 2 and 5, the arm 38 is a curvilinear or arcuate shape and includes a first end portion 178a and a second end portion 178b. The second end portion 178b is coupled to the arm member distal end 176b. The first end portion 178a includes a roller 180 that is in contact with the upper surface 91a of the body member 76 of the piston 74. As such, when the piston 74 travels anywhere between the no flow positon and the full flow position, the arm pivots about a pivot portion 179 such that the roller 180 maintains contact with the upper surface 91a and the arm 38 rotates with the movement of the piston 74 along the axis 199. The rotation of the arm 38 rotates the elongated arm member 134.

The dial assembly 130 includes a spring retainer 168 and a pointer assembly 170. A spring 172 is positioned between the pointer assembly 170 and the spring retainer 168. The pointer assembly further includes a pointer member 171. The spring retainer 168 and pointer assembly 170 may also include a meter cavity 173. In some embodiments, the meter cavity 173 of the spring retainer 168 includes a bearing 174 having a bearing aperture 177.

The meter cavity 173 is configured to receive the elongated arm member 134. In some embodiments, the meter cavity 173 receives an arm member proximate end 176a while the remainder of the elongated arm member 134 and an arm member distal end 176b extends though the housing bore 160. The arm member distal end 176b extends though the housing opening 39 of the bracket assembly 30 of the second portion 20 of the housing 16. The arm 38 is coupled, within the second portion 20 of the housing 16, to the arm member distal end 176b of the elongated arm member 134. The spring retainer 168 further includes a bore 185 configured to receive a fastener, such as a set screw, a rivet, a bolt, and the like, to prevent relative movement between the arm member 134 and the spring retainer 168. As such, the arm 38, the elongated arm member 134, the dial assembly 130, the pointer assembly 170 and the display device 132 work in conjunction to convey a measured flow rate to the user. That is, in some embodiments, the pointer member 171 of the pointer assembly 170 moves due to the rotation of the elongated arm member 134 due to the movement of the arm 38 due to the movement of the upper surface 91a of the body member 76 of the piston 74 relative to the flow rate and may provide a visual indicator with reference to the display device 132 such that, in the analog embodiment, the pointer member 171 moves across a portion of the display device 132 to indicate the current flow rate. As such, when the piston 74 is in the no flow position, as best seen in FIG. 3, the pointer member 171 may be positioned at a zero mark on the display device 132 due to the arm 38 being at the home position, or without pivot at a pivot portion 179, such that there is no rotation of the elongated arm member 134.

As the piston 74 moves from the no flow position towards the full flow position, as best seen in FIG. 4, the arm 38 pivots about the pivot portion 179 such that the roller 180 rides the upper surface 91a of the body member 76 of the piston 74, which in turn rotates the elongated arm member 134. As the elongated arm member 134 rotates, the arm member proximate end 176a positioned within the meter cavity 173 rotates such that the pointer member 171 of the dial assembly 130 moves. As such, the pointer member 171 indicates on the display device 132 the current flow rate that is passing through the plate orifice 127, the axial fluid passage 40 and exiting the inline flow control assembly 12 via the outlet 24, as discussed in greater detail herein. It should be understood that the travel of the arm 38 is configured to be optimized through a largest angle possible to such that the pointer member 171 may provide a sweep on the display device 132 that is legible to the user.

Figure 13:
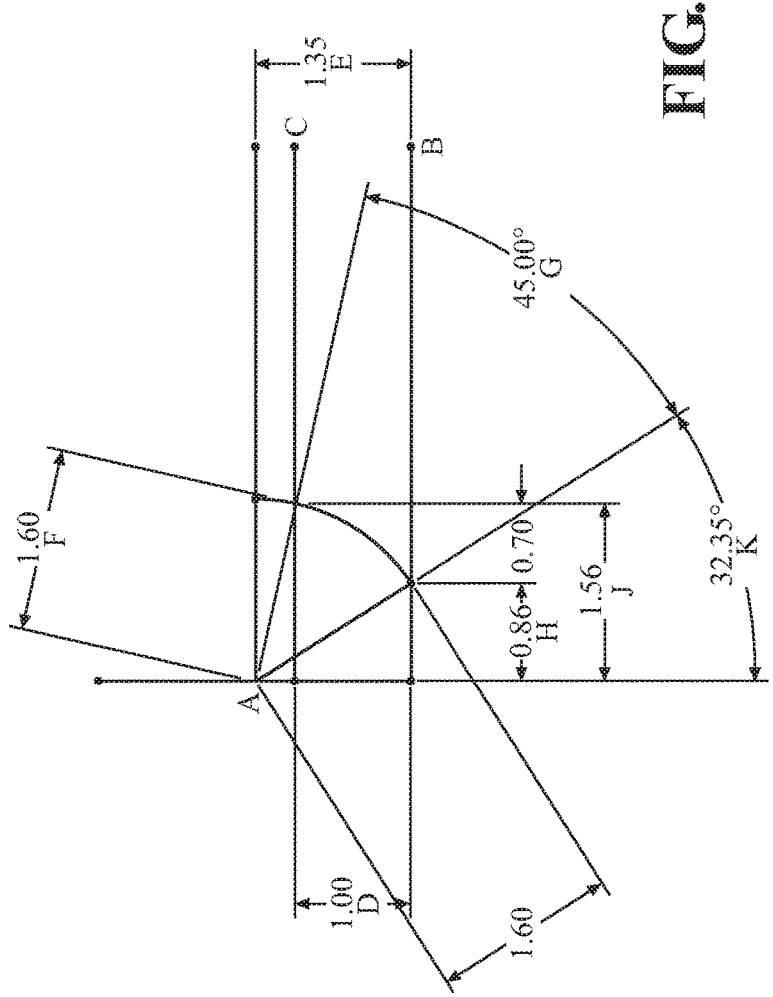
FIG. 13 schematically depicts a travel of an arm of the inline flow meter system of FIG. 1, according to one or more embodiments described herein.

Now referring to FIGS. 5 and 13, a travel of the arm 38 of the inline flow meter assembly 14 will be further described. In some embodiments, point A represents a centerline of the elongated arm member 134. Line B represents an uppermost surface of the piston 74 when the piston 74 is in the no flow position. Line C represents the uppermost surface of the piston 74 when the piston 74 is in the full flow position. In this embodiment, the travel of the piston 74 from the no flow position, as shown in FIG. 3, to the full flow position, as shown in FIG. 4, is illustrated as dimension D in FIG. 13. The position of the axis of the arm 38 is positioned at a distance E above the uppermost surface of the piston 74 when the piston 74 is in the no flow position such that when the piston 74 is at its full travel, or the full flow position, the arm 38 does not impede the travel of the piston 74. The length of the arm 38 is shown as dimension F, such that in its range of travel, the arm 38 does not interfere with the axial fluid passage 40 formed between the inlet 22 and outlet 24 of the housing 16.

It should be appreciated that the length of the arm 38 permits the arm 38 to rotate through the angle G at the full flow position. As such, this rotation causes the first end portion 178a of the arm 38, moving across the upper surface 91a of the body member 76, to move from position H, at the no flow position, to position J, the full flow position. It should also be appreciated that the length of the arm 38 permits the arm 38 to achieve an angle K relative to the axis of travel of the piston 74, which is large enough to impart a sufficient rotational component to the force of the piston 74 acting on the arm 38 to encourage rotation with sufficient mechanical advantage. As discussed above, this rotation causes the arm member proximate end 176a positioned within the meter cavity 173 to rotate such that the pointer member 171 of the dial assembly 130 moves relative to the display device 132 such that a current flow rate may be indicated to the user.

Figure 6:
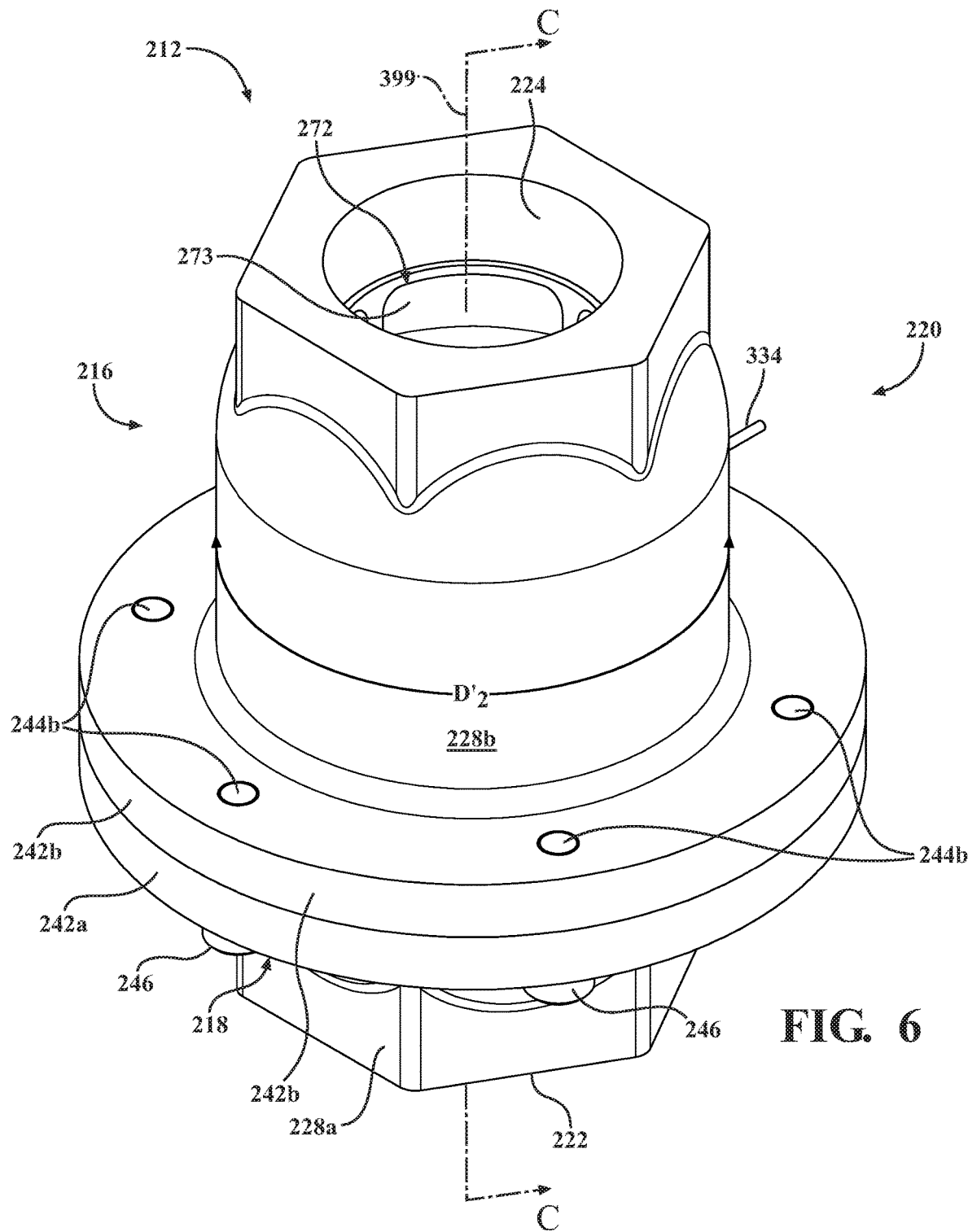
FIG. 6 schematically depicts an isolated perspective view of a second embodiment of the inline flow control assembly of FIG. 1, according to one or more embodiments described herein.
Figure 7:
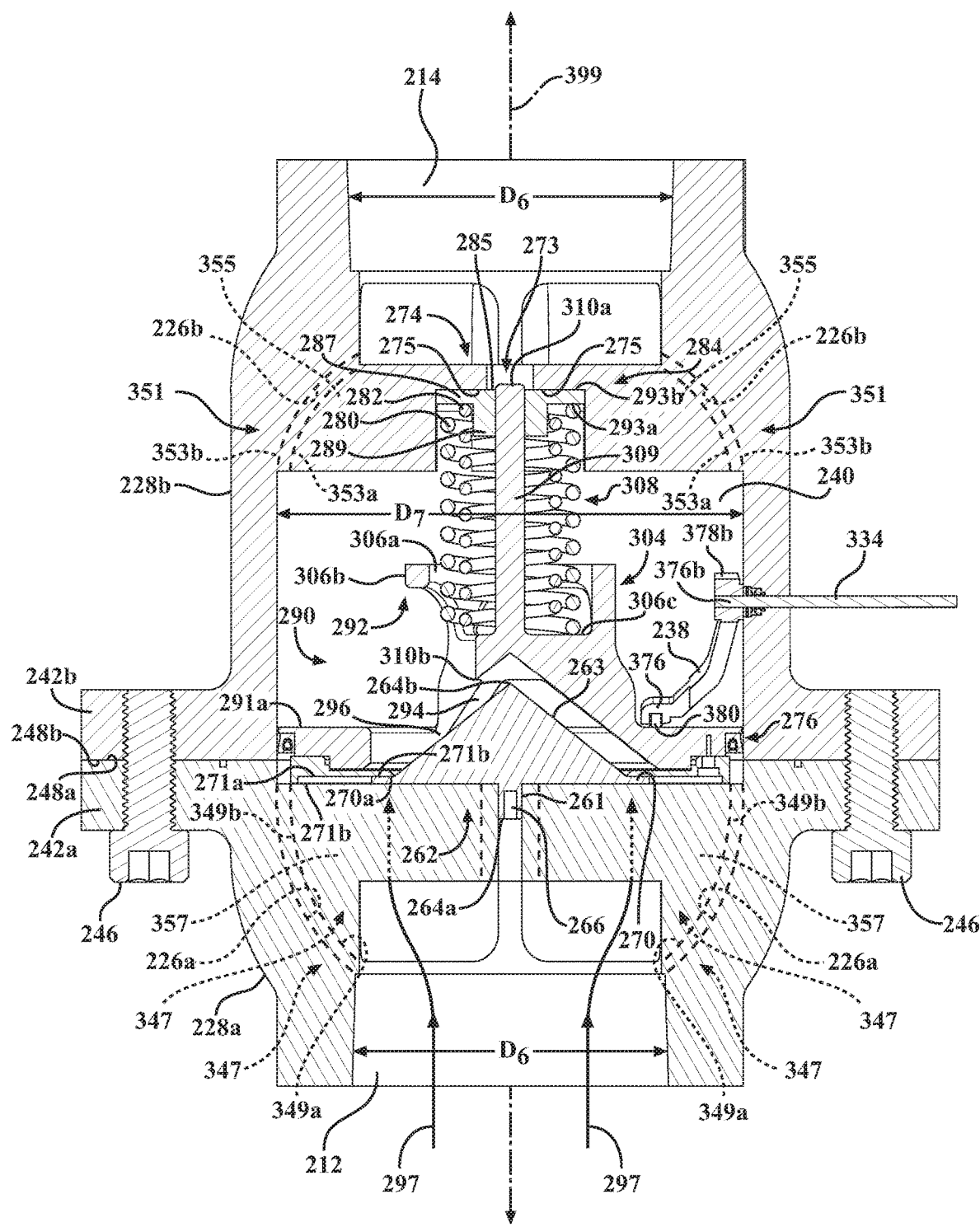
FIG. 7 schematically depicts an isolated cross sectional view of the inline flow control assembly of FIG. 6 taken from line C-C with the piston in the no flow position, according to one or more embodiments described herein.
Figure 8:
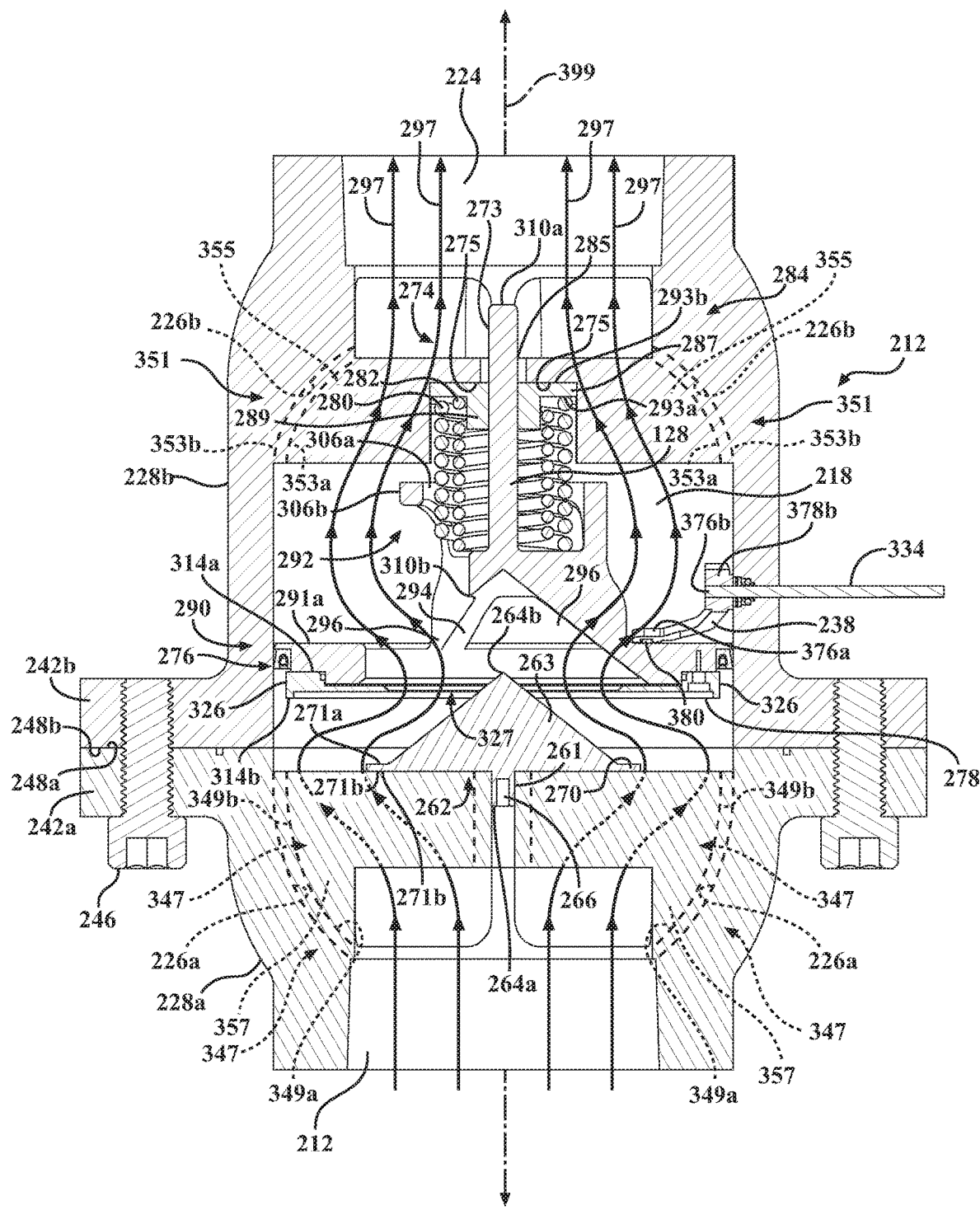
FIG. 8 schematically depicts an isolated cross sectional view of the inline flow control assembly of FIG. 6 taken from line C-C with the piston in the full flow position and a fluid flow, according to one or more embodiments described herein.

Now referring to FIGS. 6-8, a second aspect of an inline flow control assembly 212 is schematically depicted. It is understood that the inline flow control assembly 212 is similar to the inline flow control assembly 12 with the exceptions of the features described herein. As such, like features will use the same reference numerals with a prefix "2" for reference numbers 10-99 and a prefix "3" for reference numerals 100-199. As such, for brevity reasons, these features will not be described again. It should be understood that the inline flow control assembly 212 is larger than the inline flow control assembly 12. The larger inline flow control assembly 212 permits for a greater amount of fluid flow per minute when compared to a maximum flow rate of the inline flow control assembly 12.

The inline flow control assembly 212 includes a first portion 218 and a second portion 220 that form a housing 216. The second portion 220 has a diameter D'2 that houses the piston 274, the plate 278 and other components of the inline flow control assembly 212. The diameter D'2 is larger than the diameter D'1 of the second portion 20 of the inline flow control assembly 12 (FIG. 1). The first portion 218 includes an inlet 222 and the second portion 220 has an outlet 224. Each of the inlet 222 and the outlet 224 may be counter bores and have a diameter D6. The diameter D6 is larger than the diameter D1 of the counter bores of the inlet 22 and the outlet 24 of the inline flow control assembly 12 (FIG. 1). Further, the axial fluid passage 240 fluidly couples the inlet 222 to the outlet 224. The axial fluid passage 240 has a fluid passage diameter D7. The fluid passage diameter D7 is larger than the fluid passage diameter D2 of the inline flow control assembly 12 (FIG. 3). As such, it should be appreciated that the inline flow control assembly 212 has a greater fluid flow than the inline flow control assembly 12 (FIG. 1). In a non-limiting example, the output of the inline flow control assembly 212 is between 30 gallons per minute to 300 gallons per minute. Further, it should be appreciated that the fluid flow 297, depicted in FIG. 8 as a line, is generally along the axis 399, as are movements of the various components (i.e., the piston 274, the plate 278, the elongated spring member 308 of the inline flow control assembly 212. It should be appreciated that the movement of the fluid flow 297 is identical to the fluid flow 97 of the inline flow control assembly 12 (FIG. 4). Further, it should be appreciated that the dashed portion of line of the fluid flow 297 in FIGS. 7-8 is passing between the leg 254 of the insert 250 and is illustrated behind the inner surface 226a of the first portion 218 of the housing 216 and is passing between the plurality of spaced apart finger members 279 and is illustrated behind the inner surface 226b of the second portion 220 of the housing 216, respectively.

Referring to FIGS. 7-8, the elongated spring member 308 extends axially from the floor 306c. The elongated spring member 308 has spring member guide portion 309 positioned between a spring member distal end 310a and a spring member proximate end 310b. The spring member distal end 310a may be configured to be received within the retainer member 284, as discussed in greater detail herein. As such, in some embodiments, the retainer member 284 includes a flange 287 that extends radially from a body portion 289. The flange 287 includes an inner surface 293a and an opposite outer surface 293b. An opening 285 extends through the body portion 289. The opening 285 of the retainer member 284 receives the spring member distal end 310a as the spring member distal end 310a passes through the retainer member 284 and is received in the channel 273 of the piston guide member 272 when the piston 274 moves from the no flow position, as best seen in FIG. 7, to the full flow position, as best shown in in FIG. 8, and as discussed in greater detail herein.

The inner surface 226b of the second portion 220 of the housing 216 includes the piston guide member 272 disposed within the axial fluid passage 240. In some embodiments, the piston guide member 272 may include a channel 273 positioned within a wall 277. The wall 277 includes a planar surface 275. The wall 277 and the channel 273 are positioned within the axial fluid passage 240 and each extend along the axis 399 within the axial fluid passage 240 below the outlet 224 towards the inlet 222. The channel 273 receives at least a portion of the elongated spring member 308 to guide the piston 274 along the axis 199 between the no flow position, as best seen in FIG. 7, and the full flow position, as best seen in FIG. 8, and as discussed in greater detail herein.

Further, the inner surface 226b of the second portion 220 of the housing 216 includes an outlet flow directional wall 351 disposed within the axial fluid passage 240. In some embodiments, the outlet flow directional wall 351 includes an inner surface 353a and an outer surface 353b that is spaced apart from the inner surface 226b of the second portion 220 of the housing 216. As such, the inner surface 353a of the outlet flow directional wall 351 forms an outlet flow directional aperture 355 that directs the fluid flow 297 from the axial fluid passage 240 to the outlet 224. In some embodiments, the outlet flow directional wall 351 circumferentially surrounds the piston guide member 272. Further, in some embodiments, the outlet flow directional wall 351 is offset from the axis 399 and the piston 274.

The inner surface 226a of the first portion 218 of the housing 216 includes an inlet flow directional wall 347 disposed between the inlet 222 and the annular ring 270 of the elongated flow member 262. In some embodiments, the inlet flow directional wall 347 includes an inner surface 349a and an outer surface 349b that is spaced apart from the inner surface 226a of the first portion 218 of the housing 216. As such, the inner surface 349a of the inlet flow directional wall 347 forms an inlet flow directional aperture 357 that directs the fluid flow 297 from the inlet 222 to the plate orifice 327. Further, in some embodiments, the inlet flow directional wall 347 is offset from the axis 399 and the piston 274.

It should be appreciated that in the no flow position, the upper surface 291a of the retainer member 284 is biased against or in contact with the planar surfaces 275 of the plurality of fingers 279 without a compression of the inner and outer springs 280, 282, as shown in FIG. 7. In the plurality of intermediate flow positions and in the full flow position, the upper surface 291a of the retainer member 284 is driven into or further biased against the planar surfaces 275 of the plurality of fingers 279 such that the retainer member 284 exerts a force on the inner and outer springs 280, 282 to compress the inner and outer springs 280, 282. The compression of the inner and outer springs 280, 282 counterbalances the displacement of the piston 274 along the axis 399 while at least the spring member distal end 310a extends through the opening 285 of the retainer member 284 and into the channel 273 of the piston guide member 272. As such, the force of the fluid at the inlet 222 needs to overcome the force of the inner and outer springs 280, 282 to displace the piston 274 such that the piston guide member 272 receives the portion of the elongated spring member 308 based on a fluid flow force that is in the direction of the axis 399.

The arm 238 of the inline flow control assembly 212 is a curvilinear or arcuate shape and includes the first end portion 378a and a second end portion 378b. The second end portion 378b is coupled to the arm member distal end 376b of the elongated arm member 334. The first end portion 378a includes the roller 380 that is in contact with the upper surface 291a of the body member 276 of the piston 274. As such, when the piston 274 travels anywhere between the no flow position and the full flow position, the roller 380 moves across the upper surface 291a, similar to the arm 38 of the inline flow control assembly 12. It should be appreciated that because of the larger surface area of the upper surface 291a of the body member 276a, the arm 238 may rotate about rotation portion 379 a greater degree than the arm 38 of the inline flow control assembly 12 (FIG. 4).

Referring to FIGS. 7-8 and 10B-10C, it should be understood that, in some embodiments, with respect to the inline flow control assembly 212, the length L is 1.0 inch. In should be understood that this is non-limiting and the length L may be greater than and/or less than 1.0 inches. It should be understood that, in some embodiments, with respect to the inline flow control assembly 212, the ending diameter A is 0.00 inches. That is, in some embodiments, each of the ending diameters A of the plurality of elongated flow members 262 terminates at a point, as discussed above with respect to the elongated flow members 62. In other embodiments, the ending diameters A terminates at a value greater than 0.00. Further, it should be understood that, in some embodiments, with respect to the inline flow control assembly 212, the starting, or base diameter B is between 1.2912 inches to 2.5 inches, as illustrated in the table of FIG. 10C. In other embodiments, the starting or base diameter B is greater than 2.5 inches and/or less than 1.2912 inches. Additionally, it should be understood that, in some embodiments, with respect to the inline flow control assembly 312, the tapered angle C is between 32.85 degrees to 51.34 degrees taken from the reference axis RA, as illustrated in the table of FIG. 10C. In other embodiments, the tapered angle C is greater than 51.34 degrees and/or less than 32.85 degrees.

It should be understood that the L' and the thickness AR are each a constant, or are common amongst the different, or interchangeable elongated flow members 262. The annular ring 270 may extend from the outer surface 265 of the fluid flow portion 263 of the elongated flow members 262 between 1.50 inches to 2.75 inches. It is understood that this is nonlimiting and the annular ring 270 may extend less than 1.50 inches or more than 2.75 inches from the fluid flow portion 263.

Further, in some embodiments, the diameter $d_0$ of the plate orifice 327 is between 1.29 inches to 2.50 inches, as illustrated in the table of FIG. 12B. In other embodiments, the diameter $d_0$ of the plate orifice 327 is greater than 2.50 inches and/or less than 1.29 inches. As such, it is understood that the flow rate may vary between 80 GPM to 300 GPM, depending on the diameter $d_0$ of the plate orifice 127 and the corresponding outer peripheral surface 265 of the fluid flow portion 263 of the elongated flow member 262, as described in greater detail above with respect to the elongated flow member 62. Further, it should be understood that this is non-limiting and the flow rate may be less than 80 GPM and/or greater than 300 GPM.

Mathematical Calculations/Explanations:

Referring to FIGS. 1-12, it is understood that the elongated flow member 62 and the plate 78 with the plate orifice 127, as well as the elongated flow member 262 and the plate 278 with the plate orifice 327, are both sized for a desired flow rate and each may be quickly and easily interchanged with a plurality of plates having various sized plate orifices and corresponding to the plurality of elongated flow members with dimensioned inwardly tapered portions with respect to the axis 199 to either prevent a fluid flow or achieve the desired flow rate, as described herein.

The fluid flow rate of the plate orifice 127 and plate orifice 327 are described with Equation (1):

$$Q = \frac{A_o v}{K} \quad \text{Equation (1)}$$

where,
Q=The fluid flow rate measured in GPM;
$A_o$=The area of the orifice in square inches (in$^2$);
v=The velocity of the liquid in feet per second (ft/sec); and
K=0.3208.

The fluid velocity is described with Equation (2):

$$\frac{v^2}{2g} = h, \qquad \text{Equation (2)}$$

Where, h is a head at which a pump can raise a water level, in feet (ft.)

$$h = \frac{\Delta P}{0.433}, \qquad \text{Equation (3)}$$

The pressure drop across the plate orifice 127 and plate orifice 327 are determined by combining Equations (2) and (3):

$$\Delta P = \frac{v^2}{2g} 0.433 \qquad \text{Equation (4)}$$

where,
ΔP is the pressure drop across the orifice in lbs/in$^2$;
g is the gravitational acceleration of 32.2 ft/sec$^2$.
The force of a spring is defined by Hooke's Law:

$$f_s = k x_s, \qquad \text{Equation (5)}$$

where,
$f_s$=force of the spring in pounds (lbs);
k=spring constant in inch per pounds (in/lbs);
$x_s$=is the distance the spring is stretched from its equilibrium position or compression of the spring in inches (in).

Referring to FIG. 11, the area that is created when the plate 78 and the plate 278 is moved from the no flow position to the full flow position defines the fluid flow rate, Q, through the plate orifice 127 of the plate 78, and the plate orifice 327 of the plate 278, equals, $A_o$, where:

$$A_o = \pi r_0^2 - \pi r_1^2 \qquad \text{Equation (6)}$$

$$\tan(\alpha) = \frac{r_0}{h} = \frac{r_1}{h - x_s} \qquad \text{Equation (7)}$$

Solving for $r_1$ yields:

$$r_1 = r_0 \frac{(h - x_s)}{h} \qquad \text{Equation (8)}$$

Substituting Equation (8) into Equation (6) yields:

$$A_o = \pi r_0^2 \left[ 1 - \frac{(h - x_s)^2}{h^2} \right] \qquad \text{Equation (9)}$$

The inner and outer springs 80, 82 and the inner and outer springs 280, 282 place forces acting on the inline flow control assembly 12, and the inline flow control assembly 212 equal to zero at equilibrium. That is, the sum of the forces acting on the piston 74, and the piston 274, such as the fluid flow 97, and the fluid flow 297 through the piston bore 96, and the piston bore 296 based on the diameter D3, the flow rate pressure acting on the piston 74, and the piston 274, and the inner and outer springs 80, 82 and the inner and outer springs 280, 282 acting on the piston 74, and the piston 274 need to equal zero at equilibrium. That is:

$$f_s = f_p \qquad \text{Equation (10)}$$

where,
$f_s$ is the force of the spring acting on the piston;
$f_p$ is the force acting on the piston as a result of the pressure drop acting on the area of the piston;
The force associated with the pressure acting on the piston is:

$$f_p = \Delta p A_p \qquad \text{Equation (11)}$$

where,
$A_p$ is the area of the piston;

$$A_p = \pi \left(\frac{d_B}{2}\right)^2 \qquad \text{Equation (12)}$$

where,
Δp is the pressure drop across the piston.

Setting Equation (5) equal to Equation (11) and substituting Equation (12) yields:

$$k x_s = \Delta p \left[ \pi \left(\frac{d_B}{2}\right)^2 \right] \qquad \text{Equation (13)}$$

$x_s$ now represents the compression of the first and/or second springs 80, 82 and the first and/or second springs 280, 282, which range from $x_s = x_0$ at zero flow to $x_s = x_{max}$ at max flow, as described in greater detail above. As such, based on Equation (4), Δp may be inserted into Equation 13 to yield:

$$k x_s = \frac{v^2}{2g} 0.433 \left[ \pi \left(\frac{d_B}{2}\right)^2 \right] \qquad \text{Equation (14)}$$

Solving for velocity, v yields:

$$v = \sqrt{\frac{k x_s 2g}{0.433 \left[ \pi \left(\frac{d_B}{2}\right)^2 \right]}} \qquad \text{Equation (15)}$$

Now using the flow rate determination from Equation (1):

$$Q = \frac{A_o v}{.3208} \qquad \text{Equation (1)}$$

Solving for $A_o$, yields:

$$A_o = \frac{Q}{v} .3208 \qquad \text{Equation (16)}$$

Using Equation (9):

$$A_o = \pi r_0^2 \left[ 1 - \frac{(h - x_s)^2}{h^2} \right]$$ Equation (9)

Solving Equation (9) for $r_0$ and letting $d_0 = 2r_0$ yields:

$$d_0 = 2\sqrt{\frac{A_0}{\pi}\left[\frac{h^2}{h^2 - (h - x_s)^2}\right]}$$ Equation (17)

Substituting Equation (16) into Equation (17) yields:

$$d_0 = 2\sqrt{\frac{\left(\frac{Q}{v}.3208\right)}{\pi}\left[\frac{h^2}{h^2 - (h - x_s)^2}\right]}$$ Equation (18)

Equation (18) defines the beginning diameter B of the fluid flow portion 63, of the elongated flow member 62, and the fluid flow portion 263 of the elongated flow member 262, which corresponds with, or is equal to the orifice diameter, $d_O$ of the plate orifice 127 of the plate 78, and the plate orifice 327 of the plate 278 as a function of the desired fluid flow rate Q.

It should be appreciated that the meter assembly 14 is configured to convert the linear travel of the piston 74 into a rotational movement of the arm 38, which is translated through the elongated arm member 134, and into the pointer assembly 170, as discussed above. Similarly, the meter assembly 214 is configured to convert the linear travel of the piston 274 into a rotational movement of the arm 238, which is translated through the elongated arm member 334, and into the pointer assembly 170, as discussed above. In response, the pointer assembly 170 moves across the display device 132 to indicate a corresponding flow rate. As such, it is appreciated that the governing equations for flow rate Q, a direct translation of the movement $x_s$ of the piston 74, and the piston 274 as a function of the change in flow rate Q, is inherently non-linear as it contains a $r_0^2$ term. Converting the movement of the piston 74, and the piston 274, $x_s$, into a rotational component uses a cos $$\cos^{-1}\left(\frac{d}{L}\right)$$

term, where d is the length of the arm L, minus the travel, $x_s$. As such, a linear, or nearly linear scale is introduced and produces an evenly distributed granularity across the full range of angular travel. The evenly distributed granularity of the scale adds to the usability of the scale to the user. As such, it should be understood that the flow meter assembly 14 converts a linear travel of the piston 74, and the piston 274 into a rotational movement that is output to the user. In some embodiments, the conversion is a ratio incorporating the linear fluid flow amount and travel of the piston 74, and the piston 274 to the amount of rotation of the arm 38, and the arm 238. That is, the fluid flow amount pushes on the piston 74, and the piston 274, which causes the piston 74, and the piston 274 to move or travel between the no flow position and the full flow position, which is used to calculate the current flow rate of the inline flow meter system 10.

Example

Figure 14A:
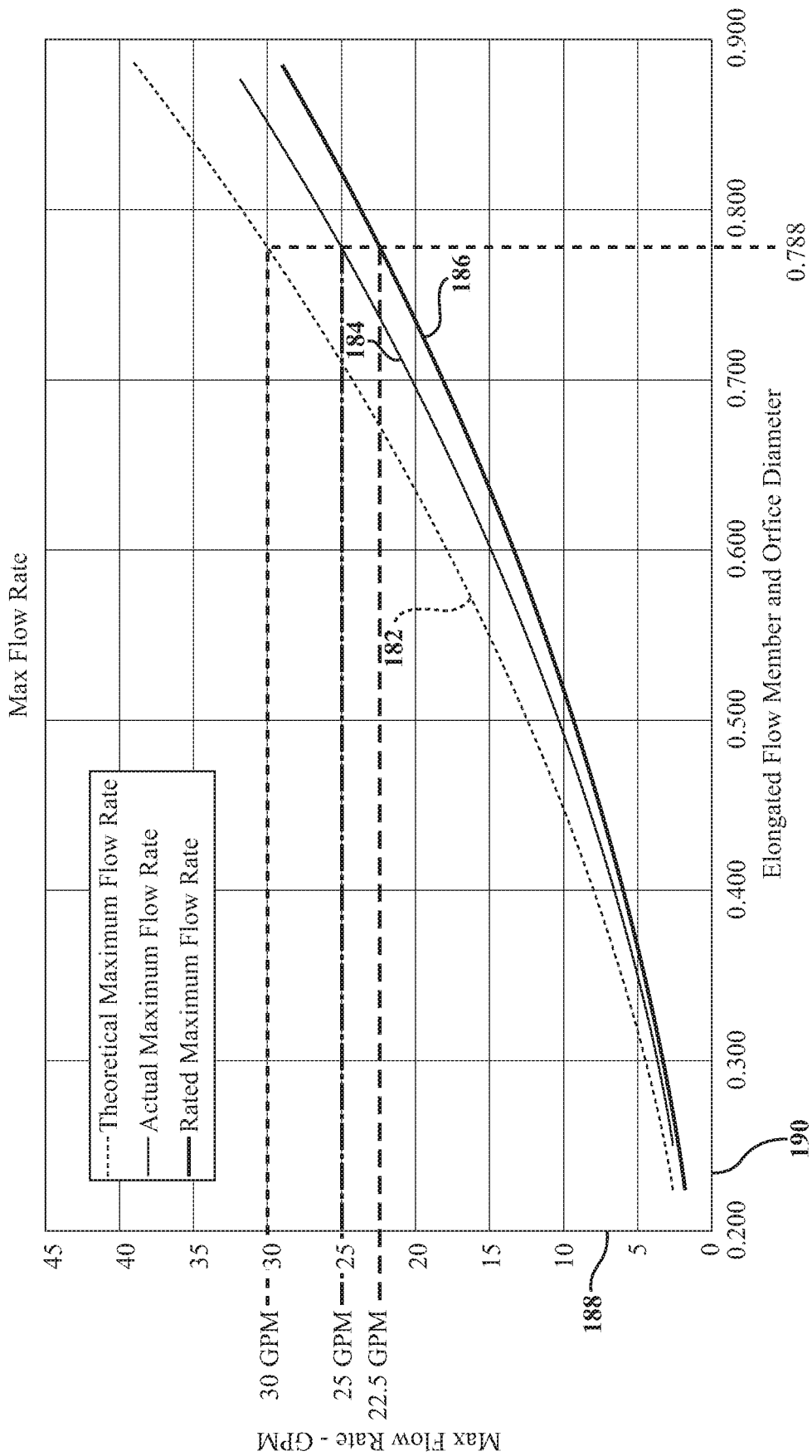
FIG. 14A schematically depicts a graphical representation of an actual maximum flow rate of the inline flow control assembly of FIG. 1 and a first example Rosaen Coefficient calculation, according to one or more embodiments described herein.
Figure 14B:
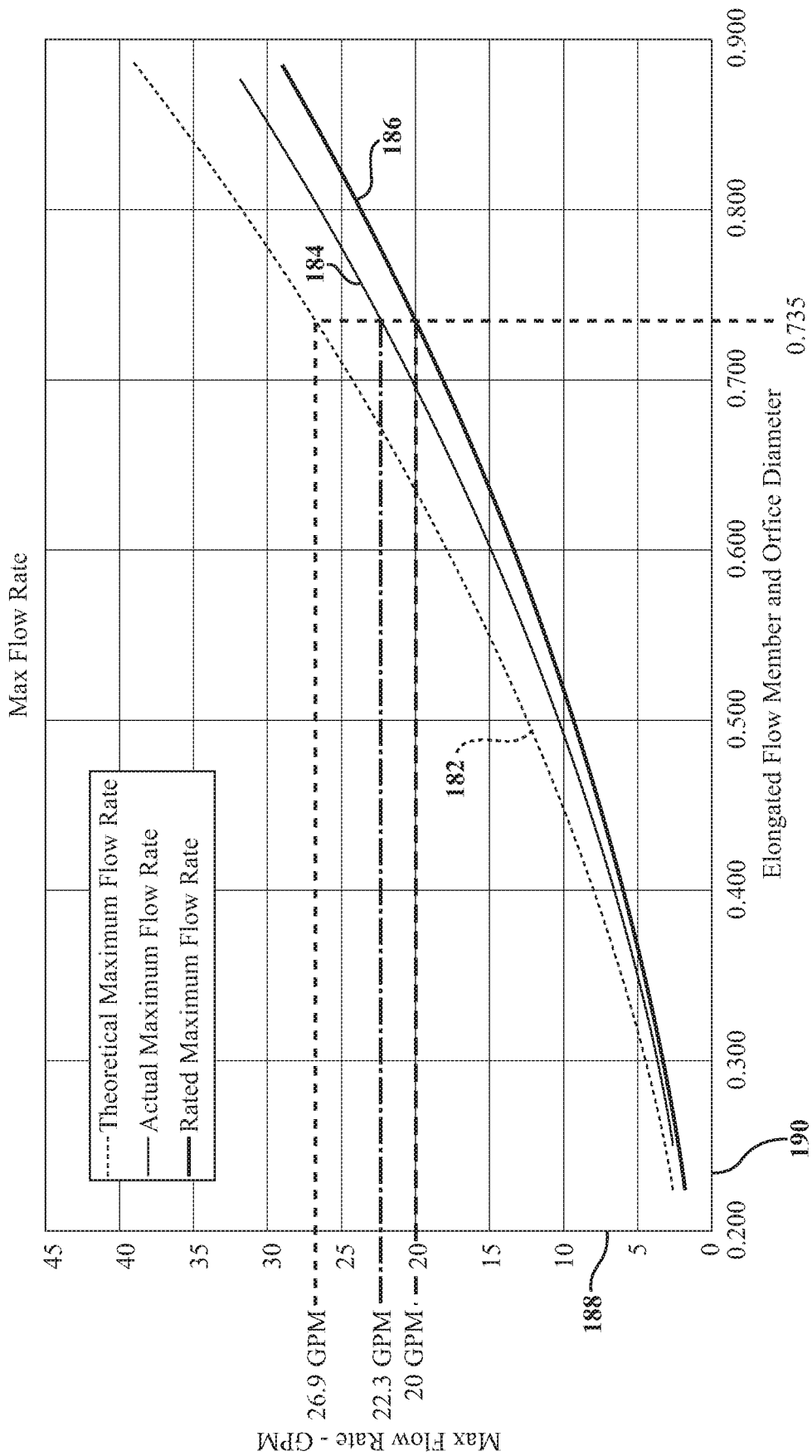
FIG. 14B schematically depicts a graphical representation of an actual maximum flow rate of the inline flow control assembly of FIG. 1 and a second example Rosaen Coefficient calculation, according to one or more embodiments described herein.

With reference still to FIGS. 1-5 and now also referring to FIG. 14, a numerical example for determining the elongated flow member 62 and the plate orifice 127 having the orifice diameter $d_0$ of the inline flow control assembly 12 is provided. It should be appreciated that a similar numerical example applies to the elongated flow member 262 and the plate orifice 327 having the orifice diameter $d_0$ of the inline flow control assembly 212 with different parameters. Assume the parameters for the inline flow control assembly 12 are as follows:

$d_B = 2.519$ in $k = 20.4 \dfrac{\text{lb}}{\text{in}}$ $h = 0.75$ in $x_s = x_{max} = 0.684$ in Using these parameters and Equation (15), the velocity of the maximum fluid flow rate through the plate orifice 127 when the piston 74 is at maximum travel, or the full flow position, is at maximum travel can be calculated to equal:

$v = 20.4065$ ft/sec

If the maximum flow rate Q is set equal 30 GPM when the piston 74 is at maximum travel, where:

$Q = 30$ GPM

Solving for $d_0$ in Equation (18) yields:

$d_0 = 0.7779$ in$^2$

As such, the beginning diameter B of the fluid flow portion 63 of the elongated flow member 62, which corresponds with, or is equal to the orifice diameter, $d_0$ of the plate orifice 127 of the plate 78 as a function of the desired flow rate, Q is 0.7779 in$^2$. The orifice diameter, $d_0$ of the plate orifice 127 of the plate 78 as a function of the desired flow rate, Q is plotted respectively on the graphical representation of a maximum flow rate depicted in FIG. 14. It should be understood that the graph depicts a theoretical maximum flow rate 182 denoted by the dotted line in FIG. 14, an actual maximum flow rate 184 denoted by a solid line in FIG. 14, and a rated maximum flow rate 186 denoted by a bold solid line in FIG. 14. Further, an ordinate axis 188 is the max flow rate, in gallons per minute and an abscissa axis 190 is the elongated flow member and orifice diameter. As illustrated, the actual maximum flow rate 184, which was determined by experimentation, follows the upward curved trend of the theoretical maximum flow rate 182 and produces a better, or improved, flow rate for specific beginning diameter B of the elongated flow member 62 and the orifice diameter, $d_O$ of the plate orifice 127 when compared to the rated maximum flow rate 186, which is set at 10% less than the actual maximum flow rate 184.

A Rosaen Coefficient, $F_R$ is a ratio of the actual maximum flow rate 184 through the piston 74, as well as through the piston 274, to the theoretical maximum flow rate 182, and is defined with the following equation:

$$F_R = \frac{Q_{Actual}}{Q_{Theoretical}}$$ Equation (19)

The Rosaen Coefficient, $F_R$, is between $0<F_R<1$ and represents the efficiency of the inline flow control assembly 12 and/or the inline flow control assembly 212. That is, there is an inherent loss of energy as the fluid flow in each inline flow control assembly 12, 212 is disrupted by obstacles in the fluid path. Flow in a pipe wants to flow in a laminar pattern and flow through the plate orifice 127 as well as the plate orifice 327 and wants the outer most fluid flows to bend or become curvilinear such that the fluid passes through the plate orifice 127 and the plate orifice 327 respectively. The fluid flow 97 of the inline flow control assembly 12 is disrupted prior to the passing through the plate orifice 127 of the plate 78 by the elongated flow member 62, by the piston 74, and the piston 274, and then finally by the inner and outer springs 80, 82, as shown in FIG. 4. The fluid flow 297 of the inline flow control assembly 212 is similarly disrupted prior to the passing through the plate orifice 327 of the plate 278, by the elongated flow member 262, by the piston 274, and then finally by the inner and outer springs 280, 282 as shown in FIG. 8. These disruptions take energy away from the fluid flow 97 or the fluid flow 297 resulting in the actual maximum flow rate 184 through the inline flow control assembly 12 or the inline flow control assembly 212 to be less than the theoretical maximum flow rate 182. As such, the ratio is defined and described as the Rosaen Coefficient, $F_R$.

For example, with reference the inline flow control assembly 12 (FIG. 4), when the theoretical maximum flow rate 182 is equal to 30 GPM then the actual flow rate 184 is equal to 25 GPM. A such, the Rosaen Coefficient, $F_R$, may be calculated as the ratio of the actual flow rate 184 divided by the theoretical maximum flow rate 182, as shown in in Equation 19 above, which yields $F_R=0.83$. It should be understood that in some embodiments, the Rosaen Coefficient, $F_R$, is a constant value between $0<F_R<1$ and represents the efficiency of the inline flow control assembly 12 and/or the inline flow control assembly 212. As such, because the rated maximum flow rate 186 set to 10% less than the actual maximum flow rate 184 (e.g. in this example 25 GPM× 0.9=22.5 GPM), there may be a 10% over travel of the pointer member 171 of the pointer assembly 170 past the maximum reading mark on the scale of the display device 130. As such, if a desired flow rate is 22.5 GPM, the beginning diameter B of the fluid flow portion 63 of the elongated flow member 62, which corresponds with, or is equal to the orifice diameter, $d_O$ of the plate orifice 127 of the plate 78 as a function of the desired flow rate, Q is 0.788 inches. The maximum reading mark on the scale of the display device 130 may be 22.5 GPM, the maximum flow rate 184 through the plate orifice 127 before the piston 74 is 25 GPM, and the maximum theoretical flow rate 182 with this sized beginning diameter B of the fluid flow portion 63 of the elongated flow member 62 and orifice diameter, $d_O$ of the plate orifice 127 may be 30 GPM.

As another non-limiting example, if a desired flow rate is 20 GPM, the proper sized beginning diameter B of the fluid flow portion 63 of the elongated flow member 62 and orifice diameter, $d_O$ of the plate orifice 127 is 0.735 inches. The maximum reading mark on the scale of the display device 130 may be 20 GPM, the maximum flow rate 184 through the plate orifice 127 before the piston 74 may be 22.3 GPM, and the maximum theoretical flow rate 182 with this sized beginning diameter B of the fluid flow portion 63 of the elongated flow member 62 and orifice diameter, $d_O$ of the plate orifice 127 may be 26.9 GPM. It should also be appreciated that the ratio of the actual flow rate 184 (22.3 GPM) divided by the theoretical maximum flow rate 182 (26.9 GPM), as shown in in Equation 19 above, yields $F_R=0.83$. It should be appreciated that in some embodiments and examples, $F_R$ will be greater than or less than 0.83.

It should be understood that the beginning diameter B of the elongated flow member 262 and the orifice diameter, $d_O$ of the plate orifice 327 of the plate 278 as a function of the desired flow rate, Q has a similar graphical representation as depicted in FIG. 14. Further, it should be appreciated that the graphical representation of the beginning diameter B of the elongated flow member 262 and the orifice diameter, $d_O$ of the plate orifice 327 of the plate 278 of the actual maximum flow rate 184 follows the same upward curved trend of the theoretical maximum flow rate 382 and produces a better, or improved, flow rate for specific beginning diameter B of the elongated flow member 262 and the orifice diameter, $d_O$ of the plate orifice 327 of the plate 278 when compared to the rated maximum flow rate 186, which is set at 10% less than the actual maximum flow rate 184.

It should be appreciated that in some embodiments, the elongated flow member 62, the plate orifice 127 of the plate 78 have a one-to-one relationship where the diameter of the starting or base diameter B of the elongated flow member 62 is equal to the diameter $d_0$ of the plate orifice 127 of the plate 78 and the travel of the piston 74, between the no flow position and the full flow position, or max flow position $X_{max}$ is less than the length L of the elongated flow member 62. As such, the geometric relationship is expressed in Equation (6) through Equation (9). This relationship produces a desired flow rate between 30 gallons per minute to 2.5 gallons per hour.

Similarly, in some embodiments, the elongated flow member 262 and the plate orifice 327 of the plate 278 have a one-to-one relationship where the diameter of the starting or base diameter B of the elongated flow member 262 is equal to the diameter $d_0$ of the plate orifice 327 of the plate 278 and the travel of the piston 274 between the no flow position and the full flow position, or max flow position $X_{max}$ is less than the length L of the elongated flow member 262. As such, the geometric relationship is expressed in Equation (6) through Equation (9). This relationship produces a desired flow rate between 30 gallons per minute to 2.5 gallons per hour with respect to the inline flow control assembly 12 and produces a desired flow rate between 80 gallons per minute to 300 gallons per minute with respect to the inline flow control assembly 212. It should be understood that these are nonlimiting examples.

In other embodiments, a one-to-many relationship between the elongated flow member 62 and the plate orifice 127 of the plate 78 may be established, For example, the starting or base diameter B of the elongated flow member 62 and the diameter $d_0$ of the plate orifice 127 of the plate 78 are constant, the ending diameter A is differently sized. As such, the geometric Equations (6) through Equation (9) are altered to solve for the ending diameter A. Similarly, a one-to-many relationship between the elongated flow member 262 and the plate orifice 327 of the plate 278 may be established to solve for the ending diameter A.

Figure 15:
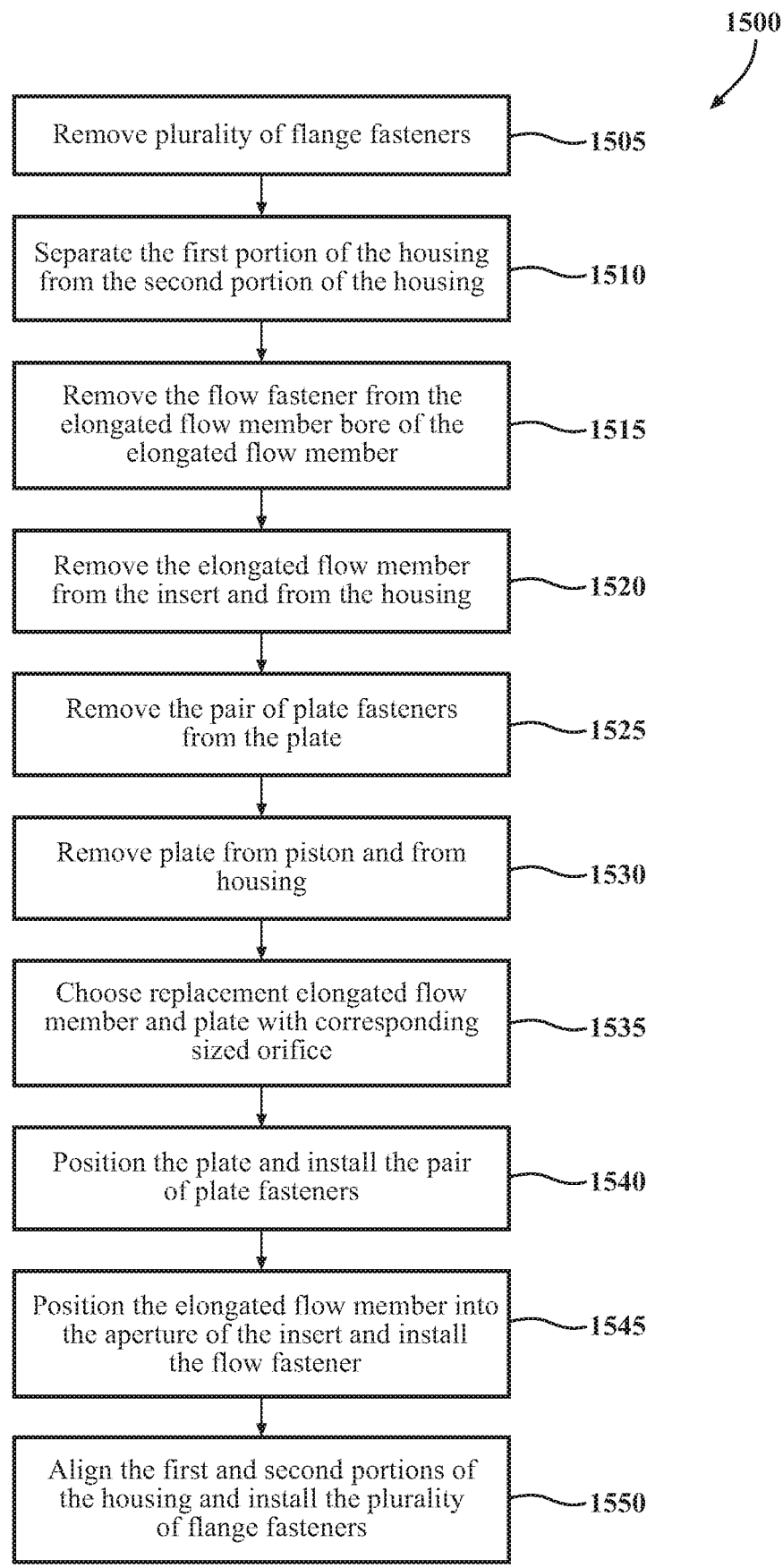
FIG. 15 schematically depicts a flowchart of an illustrative method of changing a current flow rate to a desired flow rate of the inline flow meter system of FIG. 1.

Now referring to FIG. 15, a flowchart of an illustrative method 1500 of changing a current flow rate to a desired flow rate of the inline flow meter system of FIG. 1 is depicted. At block 1505, the plurality of flange fasteners 46 are removed from the flange 42a, 42b of the housing 16. At block 1510, the first portion 18 of the housing 16 is separated from the second portion 20 of the housing 16. At block 1515, the flow fastener 68 is removed from the elongated flow member bore 66 of the elongated flow member 62 such that the elongated flow member 62 is separated or removed from the insert 50 of the first portion 18 of the housing 16 at block 1520. At block 1525, the pair of plate fasteners 102 are removed from the plate 78 such that the plate 78 with the plate orifice 127 is removed from the piston 74 and housing 16 at block 1530. At block 1535, a replacement elongated flow member 62 and a plate 78 with a corresponding plate orifice 127 are chosen. It should be appreciated that FIGS. 10 and 12 refer to the plurality of differently sized elongated flow members 62 and the differently sized plate orifices 127 to determine the correct corresponding size for the desired flow rate.

At block 1540, the plate 78 is positioned and the pair of plate fasteners 102 are installed into the plate 78 such that the plate 78 is coupled to the body member 76 of the piston 74. At block 1545, the elongated flow member 62 is positioned within the aperture 58 of the insert 50 and the flow fastener 68 is installed into the elongated flow member bore 66 of the elongated flow member 62 such that the elongated flow member 62 is coupled to the insert 50 of the first portion 18 of the housing 16. At block 1550, the plurality of flange fasteners 46 are installed coupling the flanges 42a, 42b of the first and second portions 18, 20 of the housing 16 and therefore coupling the first portion 18 to the second portion 20. It should be appreciated that the illustrative method 1500 of changing a current flow rate to a desired flow rate is similarly applied to the inline flow control assembly 212 of FIGS. 6-8.

It should be appreciated that the inline flow meter system 10 with the inline flow control assembly 12 and the flow meter assembly 14 as well as the inline flow control assembly 212 are applicable in various other types of recirculating and non-recirculating coolant systems illustratively including internal combustion engines, lasers, battery systems, computer system, and other electronic or mechanical components that requires cooling. Moreover, the inline flow meter system 10 with the inline flow control assembly 12 and the flow meter assembly 14 as well as the inline flow control assembly 212 are applicable in various other environments illustratively including, but not limited to, fluid transfer systems used in manufacturing or agriculture.

Further, it is appreciated that in some embodiments, the inline flow meter system 10 with the inline flow control assembly 12 and the flow meter assembly 14 as well as the inline flow control assembly 212 is a cooling fluid such as a coolant including water based coolants and/or natural or synthetic oil. In other embodiments, the inline flow meter system 10 with the inline flow control assembly 12 and the flow meter assembly 14 as well as the inline flow control assembly 212 is a fluid used in the production or manufacturing of products and good, chemicals, agriculture, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An inline flow meter assembly comprising:
a housing having a fluid inlet and a fluid outlet defining a fluid passage;
an elongated flow member having a shaft portion and an opposite fluid flow portion separated by an annular ring extending outwardly from an outer peripheral surface, the shaft portion is coupled to the housing to prevent movement of the shaft portion, at least a portion of the outer peripheral surface of the fluid flow portion tapering between the annular ring and a distal tip of the of the fluid flow portion; and
a piston having a plurality of bores and having a plate, the plate has a plate orifice,
wherein the piston and the plate move axially between a no flow position where the outer peripheral surface of the fluid flow portion is engaged with the plate orifice to prevent a fluid flow and a full flow position where the outer peripheral surface of the fluid flow portion is disengaged with the plate orifice such that the fluid flow enters the plate orifice, through the plurality of bores, and passes through the fluid passage in the axial direction of movement of the piston, the elongated flow member, the fluid inlet, the fluid outlet and the fluid passage are aligned on the axial direction of movement of the piston.

2. The inline flow meter assembly of claim 1, further comprising:
an inner spring coupled to the piston; and
an outer spring that circumferentially surrounds the inner spring,
wherein the fluid flow through the plate orifice generates a pressure drop across the plate that is counterbalanced by a displacement of the inner and outer springs to balance the axial direction of movement of the piston.

3. The inline flow meter assembly of claim 2, wherein the piston, the plate, the elongated flow member, the inner spring and the outer spring are aligned along the axial direction of movement of the piston.

4. The inline flow meter assembly of claim 2, further comprising:
a display device;
a dial assembly;
an arm coupled to the dial assembly and configured to move across a surface of the piston and through an angle based on a fluid flow rate, and
a pointer assembly coupled to the dial assembly,
wherein the arm translates the axial direction of movement of the piston into a rotational movement to the dial assembly such that the pointer assembly displays the fluid flow rate on the display device.

5. The inline flow meter assembly of claim 1, wherein the elongated flow member does not move with respect to the axial direction of movement of the piston.

6. The inline flow meter assembly of claim 1, wherein the outer peripheral surface of the fluid flow portion is tapered such that the fluid flow portion corresponds to a diameter of the plate orifice in the plate.

7. The inline flow meter assembly of claim 1, wherein the elongated flow member and the plate are interchangeable with a plurality of elongated flow member and plate orifice combinations.

8. The inline flow meter assembly of claim 1, wherein a fluid flow rate is dependent on a combination of a selected diameter of the outer peripheral surface of the fluid flow portion of the elongated flow member and the diameter of the plate orifice.

9. The inline flow meter assembly of claim 8, wherein the fluid flow rate is a range between 5 gallons per hour to 300 gallons per minute depending on the selected plurality of elongated flow member and plate orifice combinations.

10. A flow meter system comprising:
a flow control assembly comprising:
a housing having a fluid inlet and a fluid outlet defining a fluid passage;

an elongated flow member having a shaft portion and an opposite fluid flow portion having an outer peripheral surface, the shaft portion is coupled to the housing to prevent movement of the shaft portion; and a piston having a plurality of bores and having a plate, the plate has a plate orifice, the piston and the plate move in an axial direction between a no flow position where the fluid flow portion is engaged with the plate orifice to prevent a fluid flow and a full flow position where the fluid flow enters the plate orifice, through the plurality of bores, and passes through the fluid passage in the axial direction of movement of the piston, the fluid inlet, the fluid outlet and the fluid passage are aligned on the axial direction of movement of the piston, a flow meter assembly comprising:
 a display device;
 a dial assembly;
 an arm coupled to the dial assembly and configured to move across a surface of the piston and through an angle based on a fluid flow rate, and
 a pointer assembly coupled to the dial assembly;
 wherein the arm translates the axial direction of movement of the piston into a rotational movement to the dial assembly such that the pointer assembly displays the fluid flow rate on the display device.

11. The flow meter system of claim 10, wherein in the no flow position, the outer peripheral surface of the fluid flow portion is engaged with the plate orifice to prevent a fluid flow and in the full flow position the outer peripheral surface of the fluid flow portion is disengaged with the plate orifice.

12. The flow meter system of claim 11, wherein in the full flow position the fluid flow enters the plate orifice and passes through the fluid passage in the axial direction of movement of the piston.

13. The flow meter system of claim 12, wherein the outer peripheral surface of the fluid flow portion is tapered.

14. The flow meter system of claim 13, wherein the taper of the outer peripheral surface of the elongated flow member corresponds to a diameter of the plate orifice in the plate.

15. The flow meter system of claim 14, wherein the elongated flow member and the plate are interchangeable with a plurality of elongated flow member and plate orifice combinations.

16. The flow meter system of claim 15, wherein the fluid flow rate is dependent on a combination of a selected diameter of the outer peripheral surface of the fluid flow portion of the elongated flow member and the diameter of the plate orifice of the plate.

17. The flow meter system of claim 12, further comprising:
 an inner spring coupled to the piston; and
 an outer spring that circumferentially surrounds the inner spring,
 wherein the fluid flow through the plate orifice generates a pressure drop across the plate that is counterbalanced by a displacement of the inner and outer springs to balance the axial direction of movement of the piston.

18. The flow meter system of claim 17, wherein the piston, the plate, the elongated flow member, the inner spring and the outer spring are aligned along the axial direction of movement of the piston.

19. A method of changing a current flow rate to a desired flow rate of an inline flow control assembly, the method comprising:
 removing a flow fastener from a receiving cavity of an elongated flow member; removing the elongated flow member from a first portion of a housing, the housing having a fluid inlet and a fluid outlet defining a fluid passage;
 removing a pair of plate fasteners from a plate such that the plate with an orifice is separated from a piston and removed from the housing;
 choosing a replacement elongated flow member and corresponding plate that correlate to the desired flow rate;
 inserting the corresponding plate and installing the pair of plate fasteners such that the corresponding plate with the orifice is coupled to the piston to move in axial direction; and
 positioning the replacement elongated flow member and installing the flow fastener into the receiving cavity such that the elongated flow member is coupled to the first portion of the housing,
 wherein the piston, the plate, the fluid inlet, the fluid outlet and the fluid passage are aligned on the axial direction of movement of the piston.

20. The method of claim 19, wherein:
 the piston and the corresponding plate move on the axial direction of movement to a full flow position such that an outer peripheral surface of a fluid flow portion is disengaged with a plate orifice of the corresponding plate permitting a fluid flow to pass through the plate orifice and into the fluid passage in the axial direction of movement of the piston at the desired flow rate.

* * * * *